(12) United States Patent
Satta et al.

(10) Patent No.: US 7,695,058 B2
(45) Date of Patent: Apr. 13, 2010

(54) SEAT APPARATUS

(75) Inventors: Hiroki Satta, Ichinomiya (JP);
Hidemitsu Higashi, Kariya (JP);
Masaya Mizuguchi, Chiryu (JP);
Hideharu Kato, Toyota (JP); Tomonori Suzuki, Seto (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 35 days.

(21) Appl. No.: 11/511,390

(22) Filed: Aug. 29, 2006

(65) Prior Publication Data

US 2007/0046074 A1 Mar. 1, 2007

(30) Foreign Application Priority Data

Aug. 30, 2005 (JP) ............................. 2005-249697

(51) Int. Cl.
*B60N 2/32* (2006.01)
*B60N 2/30* (2006.01)

(52) U.S. Cl. .................. 297/15; 297/331; 297/334; 297/330

(58) Field of Classification Search .............. 297/15, 297/331, 334, 330
See application file for complete search history.

(56) References Cited

U.S. PATENT DOCUMENTS

| | | | |
|---|---|---|---|
| 5,924,755 A | 7/1999 | Müller | |
| 6,106,046 A * | 8/2000 | Reichel | 296/65.09 |
| 6,455,948 B1 * | 9/2002 | Berger | 307/10.1 |
| 6,820,911 B2 * | 11/2004 | Furui | 296/65.01 |
| 7,063,368 B2 * | 6/2006 | Kayumi | 296/65.05 |
| 7,066,539 B2 * | 6/2006 | Hatta et al. | 297/344.14 |
| 7,108,306 B2 * | 9/2006 | Suda et al. | 296/65.08 |

(Continued)

FOREIGN PATENT DOCUMENTS

JP 5-131016 A 5/1993

(Continued)

OTHER PUBLICATIONS

First Official Letter issued Sep. 29, 2009 in corresponding Japanese Patent Application No. 2005-249697, and English language translation of the First Official Letter by Japanese Patent Office.

*Primary Examiner*—David Dunn
*Assistant Examiner*—James Alex
(74) *Attorney, Agent, or Firm*—Buchanan Ingersoll & Rooney PC

(57) ABSTRACT

A seat apparatus includes a seat cushion on which an operator is seated, a seatback for supporting the operator seated on the seat cushion, a seat drive device changing a position of the seat cushion and the seatback between a seating position and a storage position by operating the seat cushion and the seatback, and a control unit for controlling the seat drive device, the control unit controlling the seat drive device in a way that an operation starting time of the seat cushion does not coincide with an operation starting time of the seatback and an operating time of the seat cushion overlaps temporally an operating time of the seatback when the seat cushion and the seatback are moved between the seating position and the storage position such that an interference of the seat cushion and the seatback is restricted.

24 Claims, 29 Drawing Sheets

U.S. PATENT DOCUMENTS

| | | |
|---|---|---|
| 7,152,900 B2 * | 12/2006 | Trombley et al. ........ 296/65.09 |
| 7,328,939 B2 * | 2/2008 | Moriyama et al. ............ 297/15 |
| 2004/0169404 A1 * | 9/2004 | Imajo et al. .................... 297/15 |
| 2004/0174038 A1 | 9/2004 | Sumida et al. |
| 2004/0212237 A1 * | 10/2004 | Epaud et al. ................. 297/331 |
| 2005/0006920 A1 * | 1/2005 | Moriyama et al. ....... 296/65.08 |
| 2005/0012373 A1 * | 1/2005 | Fujita et al. ................. 297/337 |
| 2005/0035621 A1 | 2/2005 | Moriyama et al. |
| 2006/0208520 A1 * | 9/2006 | Trombley et al. ........ 296/65.09 |

FOREIGN PATENT DOCUMENTS

| | | |
|---|---|---|
| JP | 7-11942 U | 2/1995 |
| JP | 7-18649 U | 4/1995 |
| JP | 8-98736 A | 4/1996 |
| JP | 9-273616 A | 10/1997 |
| JP | 10-278649 A | 10/1998 |
| JP | 11-48840 A | 2/1999 |
| JP | 11-129790 A | 5/1999 |
| JP | 2000-270946 A | 10/2000 |
| JP | 2004-106640 | 4/2004 |
| JP | 2004-189011 A | 7/2004 |
| JP | 2004-196163 | 7/2004 |
| JP | 2004-249961 | 9/2004 |
| JP | 2004-249962 | 9/2004 |
| JP | 2004-249963 | 9/2004 |
| JP | 2004-262351 | 9/2004 |
| JP | 2004249962 A * | 9/2004 |
| JP | 2005-14671 A | 1/2005 |
| JP | 2005-41406 A | 2/2005 |
| JP | 2005-119496 | 5/2005 |

* cited by examiner

Seat cushion position − speed

Seat cushion position – speed

Seatback position – speed

Seat cushion position − speed

Seatback position − speed

Seatback position - speed

Seat cushion position - speed

Seatback position - speed

Seat cushion position - speed

Seatback position - speed

SEAT APPARATUS

This application is based on and claims priority under 35 U.S.C. §119 to Japanese Patent Application 2005-249697, filed on Aug. 30, 2005, the entire content of which is incorporated herein by reference.

FIELD OF THE INVENTION

The present invention relates to a seat apparatus including a seat cushion on which an operator is seated and a seatback for supporting a back of the operator.

BACKGROUND

A seat apparatus mounted to a vehicle will be explained hereinafter as an example. Conventionally, seat apparatuses are known which include a seat cushion on which an operator is seated, a seatback for supporting a back of the operator, and a drive device changing a position of the seat cushion and the seatback between a seating position and a storage position. Known seat apparatuses of this type are disclosed in JP2004-249961A, JP2004-249962A, JP2004-249963A, JP2004-106640A, JP2004-262351, and JP2005-119496A. According to the disclosed seat apparatuses, the seatback is folded forward and is locked in a condition where the seatback and the seat cushion are overlapped with each other. Next, the lock device for fixing the seatback to a floor is unlocked. Then, the overlapped seatback and seat cushion are vertically flipped rearward and are stored in a storage recess portion of a vehicle. With such structure, the seatback is placed at an upper side and the seat cushion is placed at a lower side before a storing operation of the seatback and the seat cushion is performed while the seatback is placed at the lower side and the seat cushion is placed at the upper side after the storing operation is performed because the seatback and the seat cushion are vertically flipped.

A seat apparatus is also known which includes a seatback drive device and a seat cushion drive device. According to this type of seat apparatus, the seatback is folded forward by driving the seatback drive device and is overlapped with the seat cushion. Then, the overlapped seatback and the seat cushion are moved rearward by driving the seat cushion drive device and are stored in the storage recess portion. One of the known seat apparatus of this type is disclosed in JP2004-196163A. According to the disclosed seat apparatus, the seatback and the seat cushion are moved in a condition where the seatback remains at the upper side and the seat cushion remains at the lower side and the seatback and the seat cushion are stored in the storage recess portion. On this occasion, the seatback drive device and the seat cushion drive device are driven at the same time.

With the configuration of the disclosed seat apparatuses, because the seatback and the seat cushion can be stored in the storage recess portion, a vehicle compartment can be used with a larger space and being more convenient for the operator.

According to the seat apparatuses disclosed in JP2004-249961A, JP2004-249962A, JP2004-249963A, JP2004-106640A, JP2004-262351, and JP2005-119496A, when the position of the seat cushion and the seatback are changed from the seating position to the storage position, the seatback is moved into the storage position together with the seat cushion after the seatback is folded forward. Therefore, the seatback can be prevented from interfering with other components. However, an operating time of the seatback and an operating time of the seat cushion are temporally different i.e., the operating time of the seatback and the operating time of the seat cushion are not temporally overlapped. Therefore, an entire operating time of the seatback and the seat cushion may be increased.

Further, according to the seat apparatus disclosed in JP2004-196163A, because the seat cushion and the seatback are simultaneously operated when the position of the seat cushion and the seatback are changed from the seating position to the storage position, the operating time of the seatback and the operating time of the seat cushion are temporally overlapped. Therefore, a time required for operating the seatback and the seat cushion can be reduced. However, unless the vehicle compartment includes a large space, the seatback and seat cushion may easily interfere with the other components such as a wall or a door of the vehicle compartment when the position of the seat cushion and the seatback are changed from the seating position to the storage position or changed from the storage position to the seating position.

The present invention has been made in view of the above circumstances, and provides a seat apparatus which can reduce the time required for changing the position of the seat cushion and the seatback from the seating position to the storage position and/or from the storage position to the seating position while restricting the interference of the seatback and the seat cushion with the other components such as the wall, the door, or the like.

SUMMARY OF THE INVENTION

According to an aspect of the present invention, a seat apparatus includes a seat cushion on which an operator is seated, a seatback for supporting the operator seated on the seat cushion, a seat drive device changing a position of the seat cushion and the seatback between a seating position and a storage position by operating the seat cushion and the seatback, and a control unit for controlling the seat drive device, the control unit controlling the seat drive device in a way that an operation starting time of the seat cushion does not coincide with an operation starting time of the seatback and an operating time of the seat cushion overlaps temporally an operating time of the seatback when the seat cushion and the seatback are moved between the seating position and the storage position such that an interference of the seat cushion and the seatback is restricted.

According to another aspect of the present invention, a seat apparatus includes a seat cushion on which an operator is seated, a seatback for supporting the operator seated on the seat cushion, a seat drive device changing a position of the seat cushion and the seatback between a seating position and a storage position by operating the seat cushion and the seatback, and a control unit for controlling the seat drive device, the control unit controlling the seat drive device in a way that an operating speed of at least one of the seat cushion and the seatback are changed from an initial operating speed while the seat cushion and the seatback are moving between the seating position to the storage position for restricting an interference of the at least one of the seat cushion and the seatback.

According to still another aspect of the present invention, a seat apparatus includes a seat cushion on which an operator is seated, a seatback for supporting the operator seated on the seat cushion, a seat drive device changing a position of the seat cushion and the seatback between a seating position and a storage position by operating the seat cushion and the seatback, a control unit for controlling the seat drive device, the seat drive device including a first drive device for driving the seat cushion and a second drive device for driving the seatback, the second drive device being driven independently from the first drive device, and the control unit controlling the second drive device to start a storing operation of the seatback and controlling the first drive device to start a storing operation of the seat cushion immediately after a completion of the storing operation of the seatback when the storing operation of the seat cushion and the storing operation of the seatback are performed from the seating position to the storage position.

BRIEF DESCRIPTION OF THE DRAWINGS

The foregoing and additional features and characteristics of the present invention will become more apparent from the following detailed description considered with reference to the accompanying drawings, wherein:

FIG. 18 is a flow chart illustrating a storing operation speed control a;

FIG. 19 is a graph indicating a relation between operating speed VCb and VCa of a seat cushion and a position of the seat cushion in the storing operation speed control a;

FIG. 26 is a flow chart illustrating a returning operation speed control a;

FIG. 27 is a graph indicating a relation between operating speed VBb and VBa of the seatback and a position of the seatback in the returning operation speed control a;

DETAILED DESCRIPTION

Figure 1:
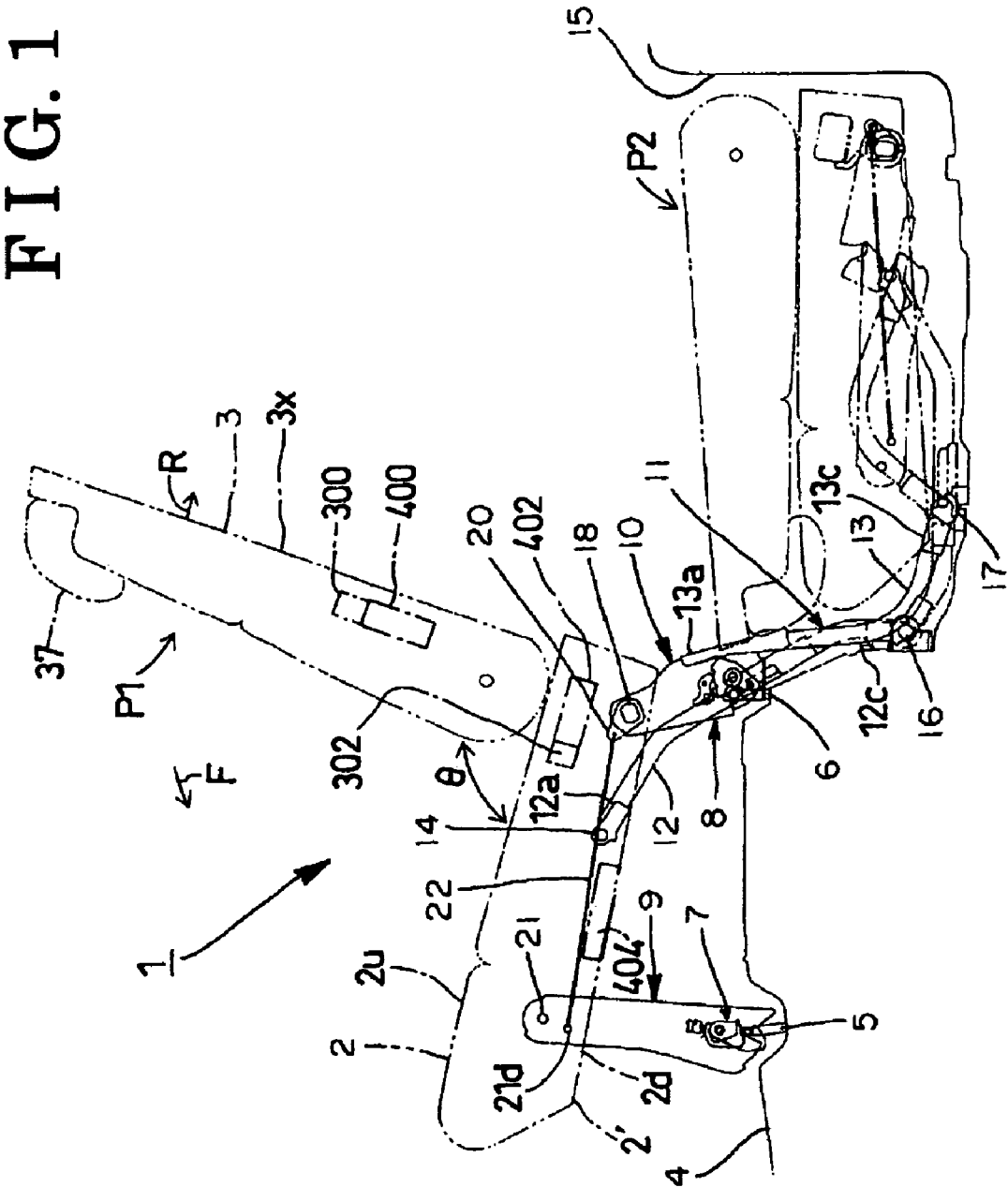
FIG. 1 is a schematic view illustrating a seat apparatus placed at a floor.
Figure 2:
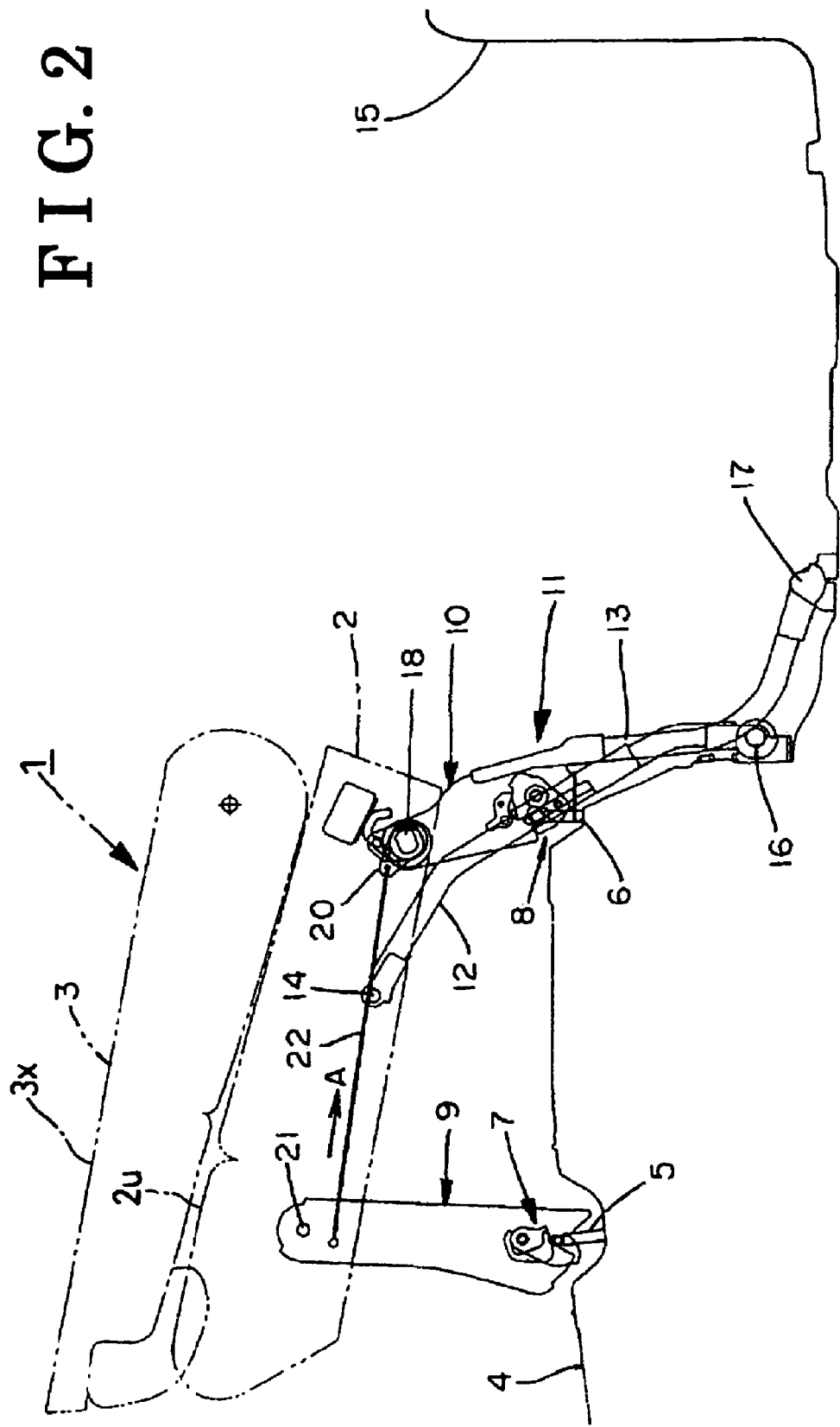
FIG. 2 is a schematic view illustrating the seat apparatus operated in the vicinity of a seating position.
Figure 3:
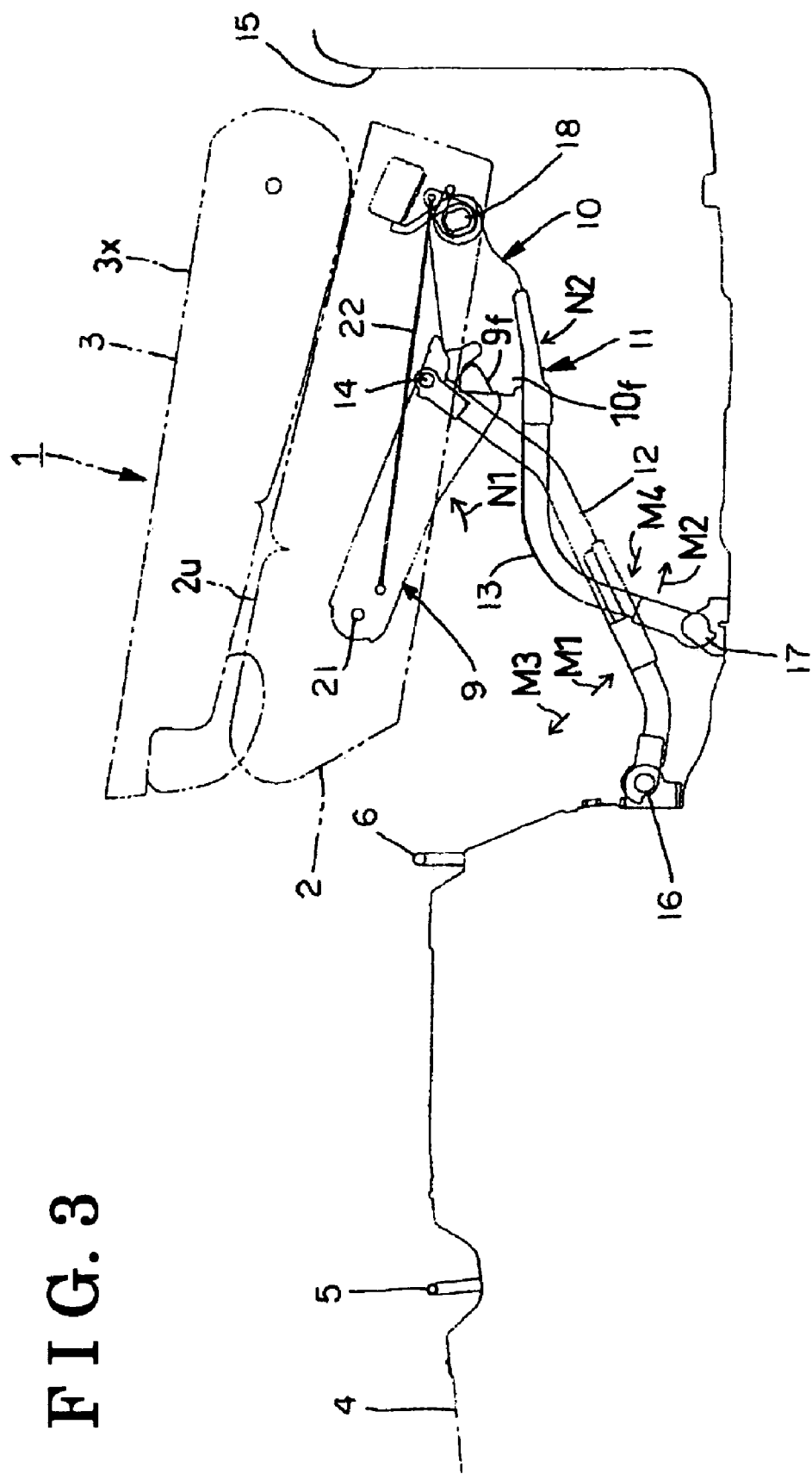
FIG. 3 is a schematic view illustrating the seat apparatus operated in the vicinity of a storage position.
Figure 4:
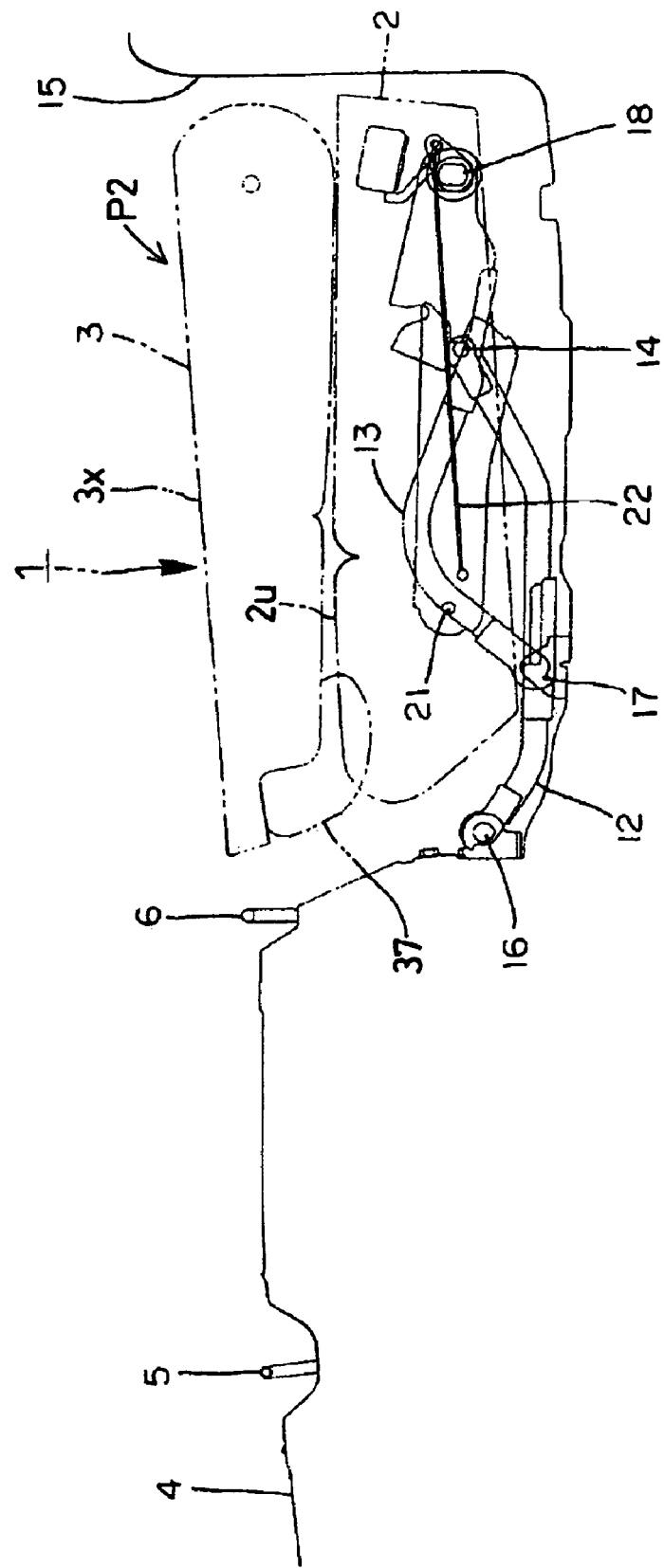
FIG. 4 is a schematic view illustrating the seat apparatus stored in the storage position.

An embodiment of the present invention applied to a seat apparatus provided in a vehicle will be explained in detail with reference to the attached drawings. With reference to FIGS. 1-4, the embodiment of the present invention is mechanically explained. As illustrated in FIG. 1, a seat apparatus 1 is provided as a seat of a vehicle floor 4 (base body). The seat apparatus 1 includes a seat cushion 2 on which an operator is seated and a seatback 3 for supporting a back of the operator. The seatback 3 is rotatable relative to the seat cushion 2. A position of the seat apparatus 1 can be changed between a seating position P1 placed at a relatively front side of the floor 4 and a storage position P2 placed at a relatively rear side of the floor 4. As illustrated in FIG. 1, at the seating position P1, the seat cushion 2 of the seat apparatus 1 is locked by means of locking devices 7 and 8 and the seatback 3 is generally set at a stand angle θ relative to the seat cushion 2. As illustrated in FIG. 4, at the storage position P2, the seat cushion 2 and the seatback 3 of the seat apparatus 1 are stored in a recess portion 15 in such a manner that the seat cushion 2 and the seatback 3 of the seat apparatus 1 are overlapped with each other. The recess portion 15 is formed at the vehicle floor 4 in such a manner to be opened upward and is placed posterior to the seating position P1. The storage position P2 is provided on the vehicle floor 4 at a rear side relative to the seating position P1 in a back and forth direction of the vehicle. A front striker 5 (a fixed side engaging member) and a rear striker 6 (a fixed side engaging member) are fixed to the vehicle floor 4 at the seating position P1.

A headrest 37 is provided on a top portion of the seatback 3. The seat cushion 2 includes a frame 2' which is slidable in the back and forth direction of the vehicle, i.e., in a position adjusting direction. The seat cushion 2 further includes a front leg 9 serving as a first engaging member and a rear leg 10 serving as a second engaging member and the seat cushion 2 is supported at the vehicle floor 4 by means of the front leg 9 and the rear leg 10. The front leg 9 is provided with the locking device 7 engageable with the striker 5 of the vehicle floor 4. The rear leg 10 is provided with the locking device 8 engageable with the striker 6 of the vehicle floor 4. The front leg 9 is pivotally supported at the frame 2' of the seat cushion 2 through a pivot point 21.

A supporter 11 for supporting the seat cushion 2 is configured of four link devices (i.e., a moving mechanism) which moves the seat cushion 2. More specifically, the link devices include a first link pair 12 and a second link pair 13 provided at the seat cushion 2 at right and left sides thereof (both sides in a width direction of the vehicle). The link devices move the seat cushion 2 between the seating position P1 and the storage position P2 in such a manner that an upper surface 2u of the seat cushion 2 remains at an upper side and a downside surface 2d of the seat cushion 2 remains at a lower side without vertically flipping the seat cushion 2. Because the seat apparatus according to the embodiment of the present invention does not adopt a system of turning over the seat cushion centering about an end portion of the seat cushion, an excessively falling of objects placed on the seat apparatus 1 can be restricted. Further, a lock between the seat cushion 2 and the seatback 3 during a movement thereof is not required and an increase in a turning radius of the seat cushion can be restricted. A first end portion 12a of the first link 12 is pivotally supported at a pivot point 14 of the frame 2' of the seat cushion 2. A second end portion 12c of the first link 12 is pivotally supported at a pivot point 16 in the recess portion 15. A first end portion 13a of the second link 13 is fixed to the rear leg 10. A second end portion 13c of the second link 13 is pivotally supported at a pivot point 17 in the recess portion 15. The pivot point 16 and the pivot point 17 are placed away from each other. A horizontal type shaft 18 is provided at the frame 2' for swingably supporting the rear leg 10 relative to the frame 2' of the seat cushion 2. A bracket 20 is fixed to the shaft 18. A connect portion 21d placed below the pivot point 21 of the front leg 9 and the bracket 20 of the shaft 18 are connected by means of a cable 22.

As illustrated in FIG. 1, a seat cushion motor 402 (i.e., a seat cushion actuator, a first drive device) is provided at the frame 2' of the seat cushion 2. The seat cushion motor 402 is a driving source of a storing operation and a returning operation of the seat cushion 2 for moving the seat cushion 2 between the seating position P1 and the storage position P2. An unlock motor 404 (i.e., an unlock actuator) for unlocking the locking devices 7 and 8 is provided at the frame 2'. A seatback motor 400 (i.e., a seatback actuator, a second drive device) is provided at an inside of the seatback 3. The seatback motor 400 is a driving source of a storing operation and a returning operation of the seatback 3 for inclining the seatback 3 forward (a direction of an arrow F in FIG. 1) and backward (a direction of an arrow R in FIG. 1). In the storing operation of the seatback 3, the stand angle of the seatback 3 relative to the seat cushion 2 is reduced to suit the storing operation of the seat apparatus 1. In the returning operation of the seatback 3, the stand angle of the seatback 3 relative to the seat cushion 2 is increased to suit the seating of the operator.

Figure 6:
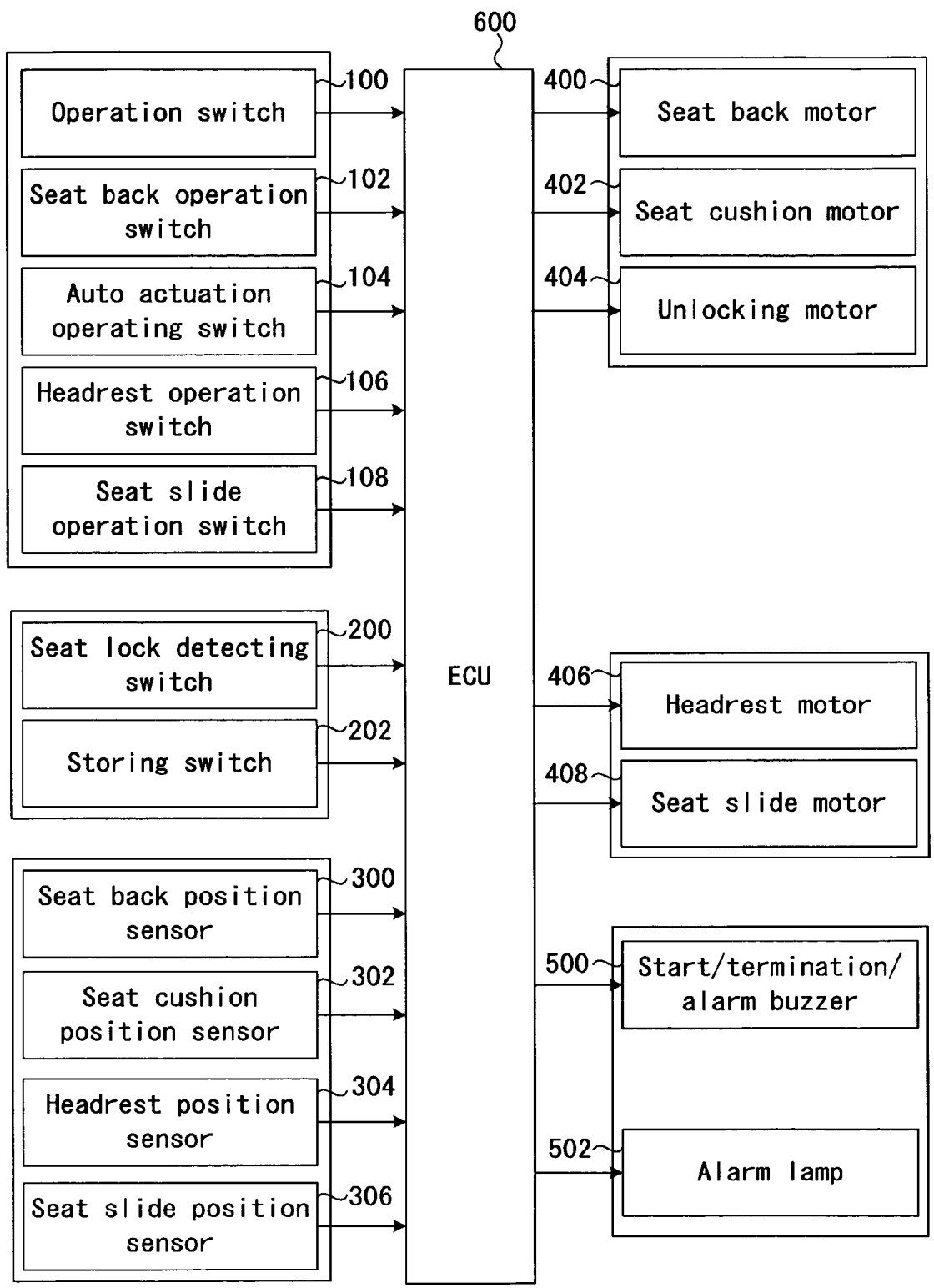
FIG. 6 is a block diagram of a control system.

Illustrated in FIG. 6 is a block diagram of a control system. An operating switch 100 (i.e., an operating portion) manually operated by the operator functions as a signal generating portion which outputs a storing operation command signal and a returning operation command signal for moving the seat apparatus 1 between the seating position P1 and the storage position P2. The operating switch 100 changes the position of the seat apparatus 1 between the seating position P1 and the storage position P2 by driving the seat cushion motor 402 and the seatback motor 400. When the manual operation of the operating switch 100 is continued, the driving of the seatback motor 400 and the seat cushion motor 402 are continued and a position of the seat apparatus 1 is changed between the seating position P1 and the storage position P2. If the manual operation of the operating switch 100 is interrupted, the driving of the seatback motor 400 and the seat cushion motor 402 is stopped and the seat apparatus 1 is stopped at the present position. According to the embodiment of the present invention, the operating switch 100 is provided at a back door 700 side of the vehicle where a hand of the operator may not reach for preventing the movement of the seat apparatus 1 with the operator seated thereon. However, the present invention is not limited thereto and the operating switch 100 may be provided at other parts of the vehicle.

Figure 5:
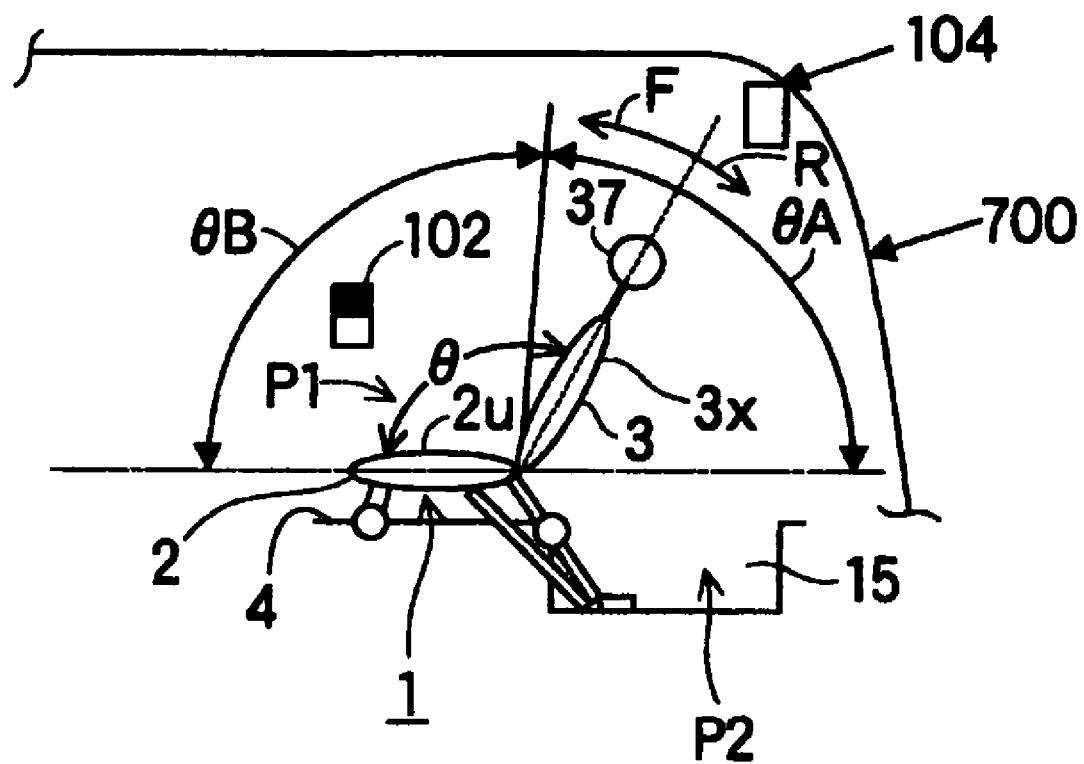
FIG. 5 is a schematic view illustrating the seat apparatus in a vehicle compartment.

A seatback operating switch 102 is provided for a reclining operation of the seatback 3. According to the embodiment of the present invention, as illustrated in FIG. 5, the seatback operating switch 102 is provided in the vicinity of the seat apparatus 1 so that the operator seated on the seat apparatus 1 can operate the seatback operating switch 102. However, the present invention is not limited thereto and the seatback operating switch 102 may be provided at other part of the vehicle. According to the embodiment of the present invention, when the operator seated on the seat apparatus 1 operates the seatback operating switch 102, the seatback 3 can be inclined only within a fine adjustable range θ A (i.e., a reclining range). More specifically, a fine adjustment prohibited range θ B is set for limiting a forward inclination (i.e., an inclination in the direction of the arrow F in FIG. 1) of the seatback 3 when the operator seated on the seat apparatus 1 operates the seatback operating switch 102. Accordingly, when the operator seated on the seat apparatus 1 operates the seatback operating switch 102, the inclination of the seatback 3 into the fine adjustment prohibited range θ B is prohibited for preventing the operator from being applied with an excessive load by the seatback 3. In this regard, however, the operating switch 100 and an automatic operating switch 104 can operate the seatback 3 and the seat cushion 2 to overlap with each other. The automatic operating switch 104 inclines the seatback 3 of the seat apparatus 1 forward (the direction of the arrow F in FIG. 1) and backward (the direction of the arrow R in FIG. 1) by driving the seatback motor 400. According to the embodiment of the present invention, as illustrated in FIG. 5, the automatic operating switch 104 is provided in the vicinity of the back door 700 of the vehicle.

A headrest operating switch 106 moves the headrest 37 between a headrest using position and a headrest storage position by driving a headrest motor 406 (i.e., a headrest actuator, a third drive device). A seat slide operating switch 108 adjusts a position of the frame 2' of the seat cushion 2 in the back and forth direction of the vehicle (a slide direction) by driving a seat slide motor 408 (i.e., a seat slide actuator, a fourth drive device). The seat slide motor 408 moves the cushion frame 2' of the seat cushion 2 along the slide direction (the back and forth direction of the vehicle). A seat lock detecting switch 200 provided at the seat cushion 2 in the vicinity of the locking device 7 detects if the seat cushion 2 is placed at the seating position P1 of the vehicle floor 4 and is locked by means of the locking devices 7 and 8. A storage switch 202 provided at the storage position P2 of the floor 4 detects if the seat cushion 2 is stored at the storage position P2 of the floor 4.

A seatback position sensor 300 (i.e., a physical quantity detecting means) detects an inclined position of the seatback 3. More specifically, the seatback position sensor 300 detects the position of the seatback 3 by detecting, for example, a driving amount of the seatback motor 400 on the basis of a pulse number due to magnetism or light caused by a rotation of the motor 400. A seat cushion position sensor 302 (the physical quantity detecting means) detects a position of the seat cushion 2. More specifically, the seat cushion position sensor 302 detects the position of the seat cushion 2 by detecting, for example, a driving amount of the seat cushion motor 402 on the basis of a pulse number due to magnetism or light caused by a rotation of the motor 402. A seat slide position sensor 306 (the physical quantity detecting means) detects a slide position of the frame 2' of the seat cushion 2 in the back and forth direction of the vehicle (the slide direction). More specifically, the seat slide position sensor 306 detects the slide position of the frame 2' of the seat cushion 2 by detecting, for example, a driving amount of the seat slide motor 408 on the basis of a pulse number due to magnetism or light caused by a rotation of the motor 408.

A headrest position sensor 304 (the physical quantity detecting means) detects a position of the headrest 37. More specifically, the headrest position sensor 304 detects the position of the headrest 37 by detecting, for example, a driving amount of the headrest motor 406 on the basis of a pulse number due to magnetism or light caused by a rotation of the motor 406. Signals received from each switch and each sensor are entered into an ECU 600 (i.e., a control unit). The ECU 600 includes an input processing circuit, a CPU, a memory, and an output processing circuit. The seatback motor 400, the seat cushion motor 402, the unlock motor 404, the headrest motor 406, the seat slide motor 408, an alarm buzzer 500, and an alarm lamp 502 are controlled by means of a control signal from the ECU 600.

The storing operation of the seat apparatus 1 from the seating position P1 to the storage position P2 according to the embodiment of the present invention will be explained. When the operating switch 100 is manually operated by the operator in a storing direction, the seatback motor 400 is driven, the seatback 3 is inclined forward (the direction of the arrow F in FIG. 1), the stand angle of the seatback 3 is reduced, and the storing operation of the seatback 3 is performed. In consequence, as illustrated in FIG. 2, the seat cushion 2 and the seatback 3 locked by means of the locking devices 7 and 8 are overlapped with each other. On this occasion, the seat cushion 2 is placed at the lower side and the seatback 3 is placed at the upper side. Then, when the unlock motor 404 is driven, the lock of the locking devices 7 and 8 are unlocked and the seat cushion 2 comes into a state in which the seat cushion 2 can be separated from the seating position P1. Further, when the seat cushion motor 402 is driven, the storing operation of the seat cushion 2 is performed. In other words, the seat cushion 2 on which the seatback 3 is placed moves to the storage position 2 in order of FIGS. 2-4. On this occasion, as illustrated in FIG. 3, a free end portion 9f of the front leg 9 rotates in a direction of an arrow N1 and a free end portion 10f of the rear leg 10 rotates in a direction of an arrow N2. Accordingly, the free end portion 9f of the front leg 9 and the free end portion 10f of the rear leg 10 rotate in a direction in which the end portions 9f and 10f are mutually approached, and the front leg 9 and the rear leg 10 come into a substantially horizontal state. Further, as illustrated in FIG. 3, the first link 12 rotates in a clockwise direction (a direction of an arrow M1, a direction in which the first link 12 comes into a substantial horizontal state) about the pivot point 16, and the second link 13 rotates in the clockwise direction (a direction of an arrow M2, a direction in which the second link 12 comes into a substantial horizontal state) about the pivot point 17. In consequence, as indicated by a virtual line in FIG. 4, the folded seat apparatus 1 is stored at the storage position P2 in the recess portion 15 of the floor 4 by means of the supporter 11 of the four link devices in such a manner that a back surface 3x of the seatback 3 comes into a substantial horizontal state. When the storing operation of the seat apparatus 1 is completed, a storing operation completion signal from the storage switch 202 is transmitted to the ECU 600. On this occasion, in the storage position P2, the seat apparatus 1 is folded in such a manner that the seat cushion 2 is placed at the lower side and the seatback 3 is placed at the upper side. As can be seen from FIGS. 2-4, the seatback 3 is not vertically flipped even in the course of the storing operation from the seating position P1 to the storage position P2 and the seat cushion 2 remains at the lower side and the seatback 3 remains at the upper side.

The returning operation of the seat apparatus 1 from the storage position P2 to the seating position P1 according to the embodiment of the present invention will be explained. When the operating switch 100 is manually operated by the operator in a returning direction in a condition where the folded seat apparatus 1 is stored in the storage position P2 of the floor 4, the seat cushion motor 402 is driven, the first link 12 rotates in an anticlockwise direction (a direction of an arrow M3, a direction in which the first link 12 comes to a stand state) about the pivot point 16 of the first link 12 and the second link 13 rotates in the anticlockwise direction (a direction of an arrow M4, a direction in which the second link 13 comes to a stand state) about the pivot point 17 of the second link 13. In consequence, the seat cushion 2 moves together with the seatback 3 from the storage position P2 to the seating position P1. On this occasion, when the seat cushion 2 placed above the seating position P1 comes down to the seating position P1, the locking device 7 of the front leg 9 engages with the front striker 5 of the vehicle floor 4 and the locking device 8 of the rear leg 10 engages with the rear striker 6 of the vehicle floor 4. In consequence, the seat cushion 2 is automatically locked at the seating position P1 of the floor 4. When the seat cushion 2 of the seat apparatus 1 is locked at the seating position P1, a lock completion signal from the seat lock detecting switch 200 is transmitted to the ECU 600. Further, the folded seatback 3 is moved rearward (the direction of the arrow R) and the stand angle of the seatback is gradually increased.

If a single motor is continuously driven, a load applied to the motor is increased and a motor life may be shortened. According to the embodiment of the present invention, the seat cushion motor 402 and the seatback motor 400 can independently be driven from each other and a continuous driving of the single motor is not required. Therefore, according to the embodiment of the present invention, the load applied to the seat cushion motor 402 and the seatback motor 400 can be reduced and the motors 402 and 400 can thereby be downsized. Accordingly, the motors 402 and 400 have an advantage in mounting to a relatively small space such as the seat apparatus 1 itself. Further, the seatback motor 400 can easily be driven immediately after the seat cushion motor 402 is driven while reducing the driving time of each motor 402 and 400. Likewise, The seat cushion motor 402 can easily be driven immediately after the seatback motor 400 is driven. Accordingly, the operation of the seat cushion 2 and the operation of the seatback 3 can continuously be performed while reducing the load applied to the motors 402 and 400.

Variations of the storing operation and the returning operation of the seat apparatus 1 will be explained hereinafter.

(Storing Operation 1, 2 and 3)

Figure 7:
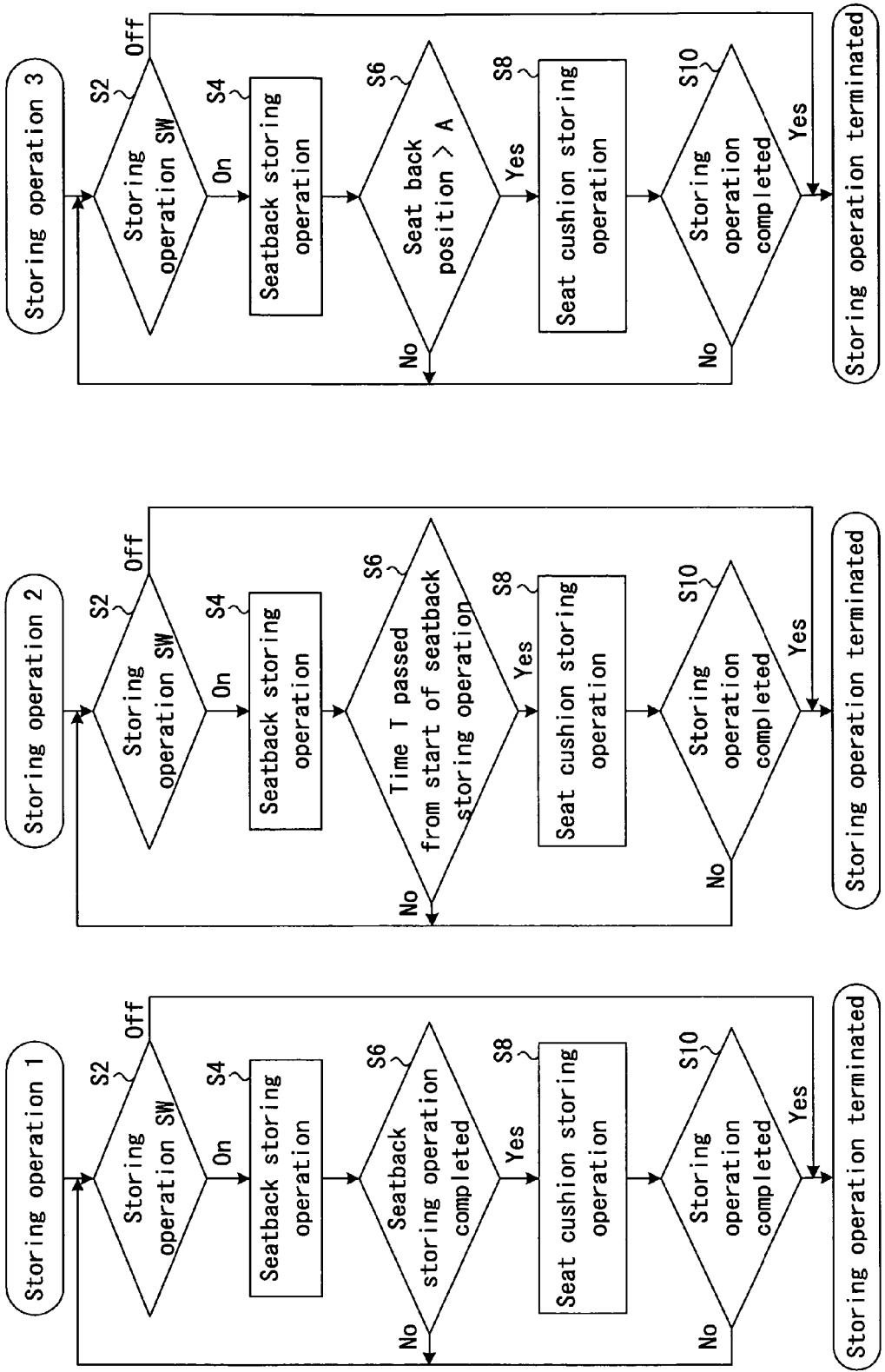
FIG. 7 is a flow chart illustrating storing operations 1, 2 and 3.

A storing operation 1 will be explained hereinafter with reference to FIGS. 7 and 8. As illustrated in FIG. 7, in step S2 of the storing operation 1, an operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the stand state seatback 3 is started and the stand angle of the seatback 3 is gradually reduced in step S4. In other words, the storing operation of the seatback 3 is performed prior to the storing operation of the seat cushion 2. In the storing operation of the seatback 3, the seatback 3 having a large stand angle is inclined by the seatback motor 400 so as to be close to the seat cushion 2 for reducing the stand angle of the seatback 3 relative to the seat cushion 2. In the storing operation 1, the storing operation of the seatback 3 is performed prior to the storing operation of the seat cushion 2 because the stand angle of the seatback 3 is generally large at the seating position P1 and a possibility of an interference of the seatback 3 may be increased. Therefore, the storing operation of the seatback 3 is performed in the initial stages.

In step 6, completion of the storing operation of the seatback 3 is determined. At the completion of the storing operation of the seatback 3, the seatback 3 is inclined forward so as to be placed on the seat cushion 2 and the stand angle of the seatback 3 is within a minimum range. If the storing operation of the seatback 3 is not completed (step S6: NO), the procedure returns to the step S2 to continue the storing operation of the seatback 3 and to reduce the stand angle of the seatback 3. In contrast, if the storing operation of the seatback 3 is completed (step S6: YES), because the possibility of the interference of the seatback 3 and the seat cushion 2 with the other components of the vehicle may not occur due to a small stand angle of the seatback 3, the storing operation of the seat cushion 2 is started in step S8. In the storing operation of the seat cushion 2, the seat cushion 2 is moved from the seating position P1 to the storage position P2 by driving the seat cushion motor 402.

In step S10, completion of the storing operation of the seat cushion 2 is determined. If the storing operation of the seat cushion 2 is not completed (step S10: NO), the procedure returns to the step S2. At this point, because the storing operation of the seatback 3 is completed, a command value from the ECU 600 transmitted to the seatback motor 400 is zero. If the storing operation of the seat cushion 2 is completed (step S10: YES), the storing operation of the seat apparatus 1 is completed. Alternatively, or in addition, an operation starting time of the seat cushion 2 and an operation starting time of the seatback 3 may temporally be different in a condition where the movement of the seat cushion 2 and the seatback 3 are temporally overlapped with each other.

Next, a storing operation 2 will be explained hereinafter with reference to FIGS. 7 and 8. The storing operation 2 is similar to the storing operation 1. As illustrated in FIG. 7, in step S2 of the storing operation 2, the operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the seatback 3 is performed prior to the storing operation of the seat cushion 2 and reduces the stand angle of the seatback 3 in step S4. Then, in step S6, an elapsed time of the storing operation of the seatback 3 is determined if a time T has passed from a starting time of the storing operation of the seatback 3. If the time T has not passed (step S6: NO), the storing operation 2 is at an initial stage and the stand angle of the seatback 3 is still at larger degree. On this occasion, because there is the possibility of the interference of seat apparatus 1 with the other components of the vehicle, the procedure returns to step S2 without performing the storing operation of the seat cushion 2 and continues the storing operation of the seatback 3 and reduces the stand angle of the seatback 3.

In contrast, if the time T has passed from the starting time of the storing operation of the seatback 3 (step S6: YES), because the interference of the seat apparatus 1 with the other components of the vehicle can be avoided due to the small stand angle of the seatback 3, the storing operation of the seat cushion 2 is started in step S8. Then, the completion of the storing operation of the seat cushion 2 and the seatback 3 is determined in step S10. If the storing operation of at least one of the seat cushion 2 and the seatback 3 is not completed, the procedure returns to step S2 to continue the storing operation.

If the storing operations of the both seat cushion 2 and the seatback 3 are completed, the storing operation of the seat apparatus 1 is completed. In a condition where a completion of the storing operation of the seatback 3 and the seat cushion 2 is temporally different, a command value is transmitted to the motor of the at least one of the seat cushion 2 and the seatback 3, the storing operation of which in not completed, for driving. On this occasion, a command value transmitted to the motor of the other one of the seat cushion 2 and the seatback 3, the storing operation of which is completed, is zero. The time T is preliminarily set so that the interference of the seat apparatus 1 with the other components of the vehicle is not generated even when the seat cushion 2 performs the storing operation. The time T is memorized in the memory of the ECU 600 with respect to each type of vehicle.

Next, a storing operation 3 will be explained hereinafter with reference to FIGS. 7 and 8. The storing operation 3 performs the steps basically similar to that of the storing operation 2. As illustrated in FIG. 7, in step 2 of the storing operation 3, the operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the seatback 3 is performed prior to the storing operation of the seat cushion 2 in step S4. Then, a position of the seatback 3 is determined if the present position of the seatback 3 reaches an intermediate position A in step S6. If the present position of the seatback 3 is not reached to the intermediate position A, because of the possibility of the interference of the seat apparatus 1 with the other components of the vehicle due to the large stand angle of the seatback 3, the procedure returns to step S2 without performing the storing operation of the seat cushion 2 and continues the storing operation of the seatback 3 and reduces the stand angle of the seatback 3. The intermediate position A is preliminarily set so that the interference of the seat apparatus 1 with the other components of the vehicle is not generated even when the seat cushion 2 is moved. The intermediate position A is memorized in the memory of the ECU 600 with respect to each type of vehicle. When the present position of the seatback 3 reaches the intermediate position A, because the possibility of the interference of the seat apparatus 1 with the other components of the vehicle can be avoided due to the small stand angle of the seatback 3, the storing operation of the seat cushion 2 is started in step S8. Then, the completion of the storing operation of the seat cushion 2 and the seatback 3 is determined in step S10. If the storing operation of at least one of the seat cushion 2 and the seatback 3 is not completed, the procedure returns to step S2 to continue the storing operation. In contrast, if the storing operations of the both seat cushion 2 and the seatback 3 are completed (step 10: YES), the storing operation of the seat apparatus 1 is terminated.

Figure 8:
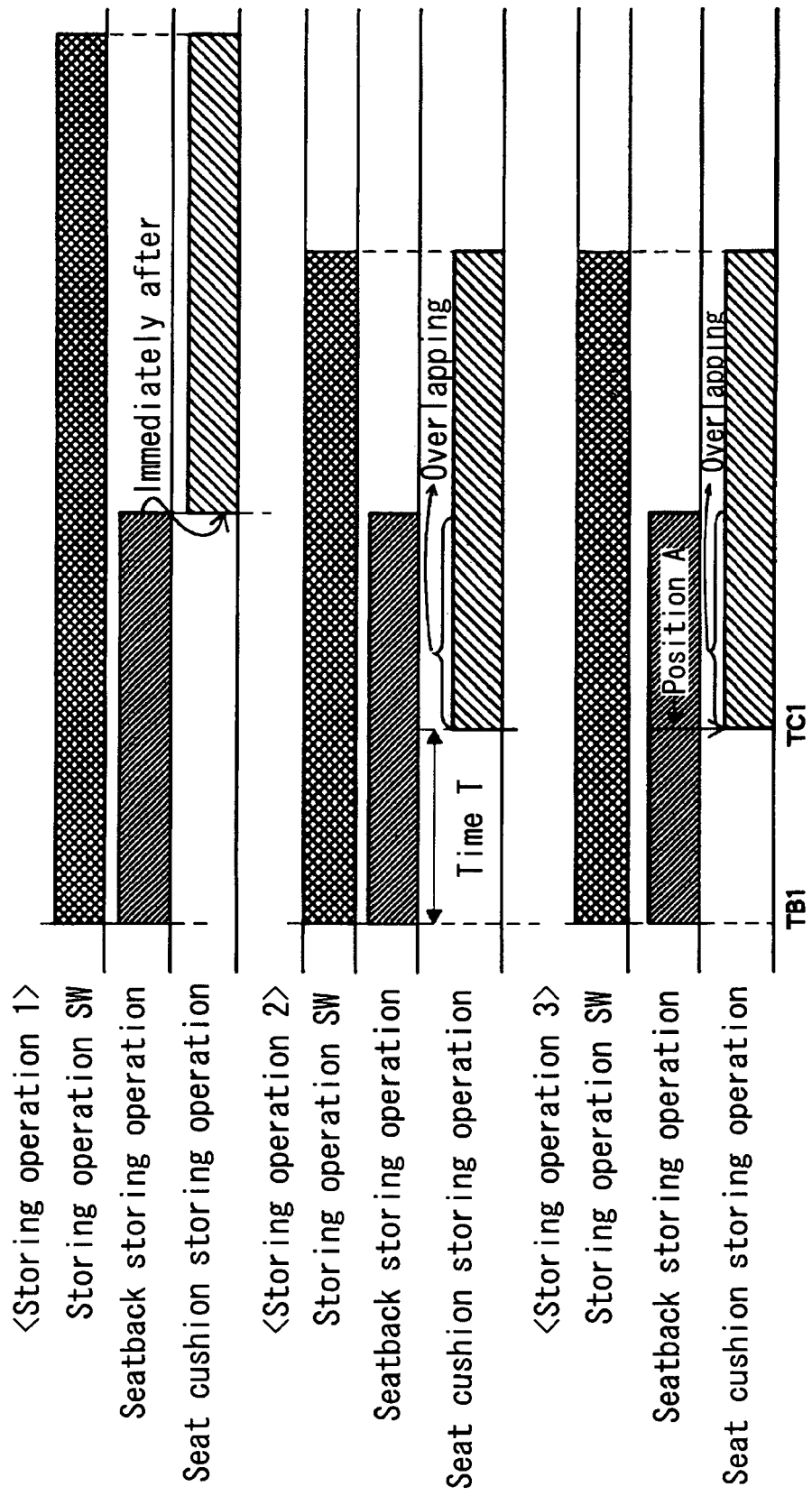
FIG. 8 is a timing chart illustrating the storing operations 1, 2, and 3.

In the storing operation 1, because the seat cushion motor 402 and the seatback motor 400 are independently driven, the storing operation of the seatback 3 is preferentially started as illustrated in FIG. 8. Then, the storing operation of the seat cushion 2 is started immediately after the completion of the storing operation of the seatback 3 without interruption. Therefore, the interference of the seat apparatus 1 with the other components of the vehicle can be prevented while reducing an entire operating time required for the storing operation 1. As long as the operation of the operating switch 100 is continued, the storing operation 1 is continuously performed. According to a timing chart illustrated in FIG. 8, in the storing operation 2, the storing operation of the seatback 3 is preferentially started and the storing operation of the seat cushion 2 is started within a period after the predetermined time T has passed from the start of the storing operation of the seatback 3 and before the storing operation of the seatback 3 is completed. In the storing operation 3, the storing operation of the seat cushion 2 is started at a time TC 1 after the seatback 3 has reached the intermediate position A and before the storing operation of the seatback 3 is completed. Accordingly, as can be seen from FIG. 8, because the operation of the seat cushion 2 and the operation of the seatback 3 are temporally overlapped with each other, the entire operating time of the storing operations 2 and 3 can be reduced relative to the storing operation 1. Therefore, an operating time required for a manual operation of the operating switch 100 can be reduced. Further, the storing operation of the seatback 3 is temporally prioritized relative to the storing operation of the seat cushion 2, an operation starting time TB1 of the seatback 3 is set earlier than an operation starting time TC1 of the seat cushion 2, and the folding operation of the seatback 3 is prioritized. In other words, in FIG. 8, the operation starting time TC1 of the seat cushion 2 is shifted relative to the operation starting time TB1 of the seatback 3 in a direction in which the operation starting time TC1 is delayed relative to the operation starting time TB1. In consequence, because the storing operation of the seat cushion 2 is performed after the stand angle of the seatback 3 becomes relatively small, the interference of the seat apparatus 1 with the other components of the vehicle can advantageously be prevented.

(Returning Operation 1, 2, and 3)

Figure 9:
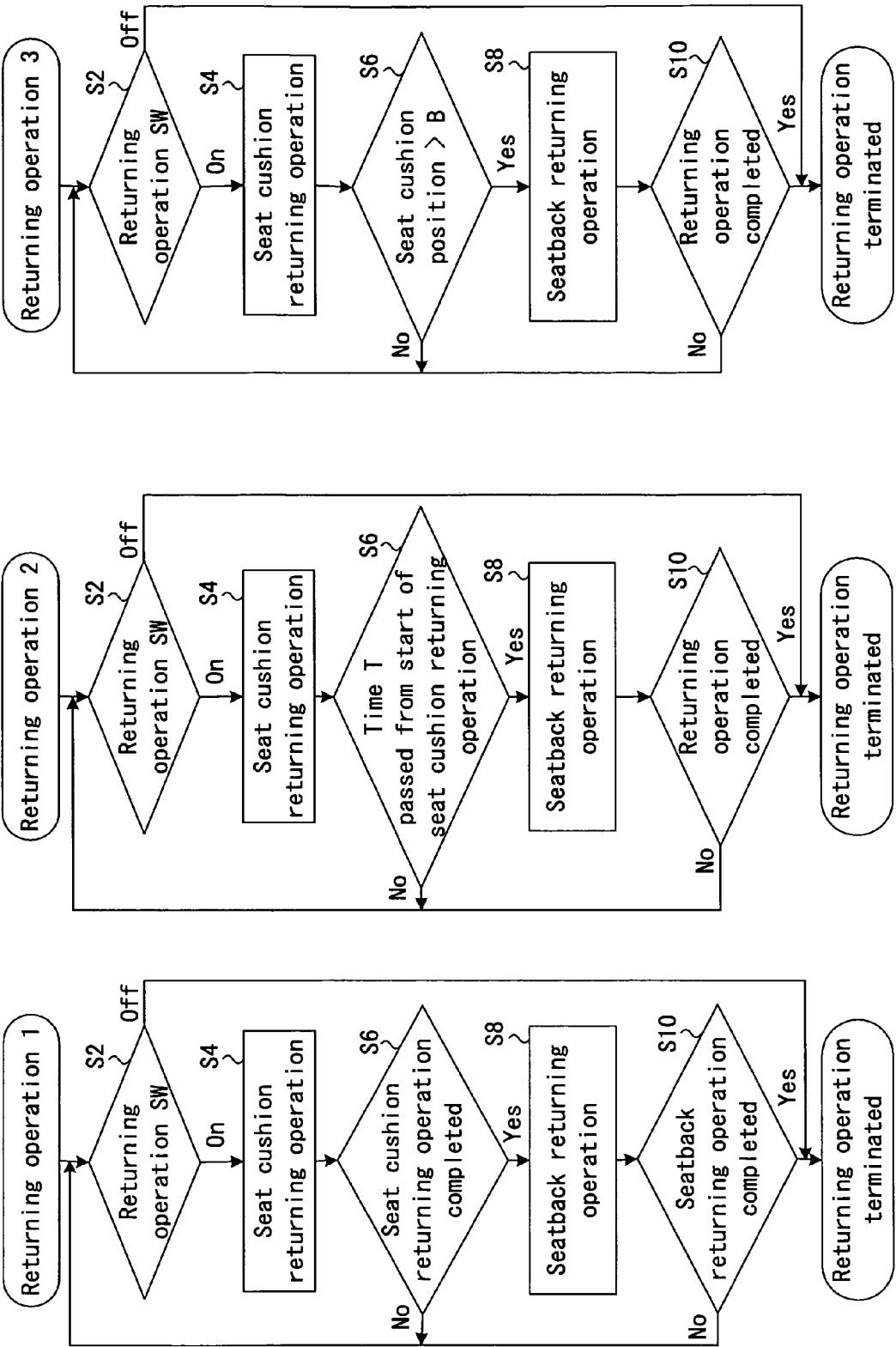
FIG. 9 is a flow chart illustrating returning operations 1, 2, and 3.

A returning operation 1 will be explained hereinafter with reference to FIGS. 9 and 10. As illustrated in FIG. 9, in step S2 of the returning operation 1, the operation state of the operating switch 100 is read. If the operating switch 100 is turned on to operate the seat cushion 2 and the seatback 3 in the returning direction, the returning operation of the seat cushion 2 is started prior to the returning operation of the seatback 3 in step S4 because the seatback 3 and the seat cushion 2 are overlapped with each other and the stand angle of the seatback 3 is small at the storage position P2. Therefore, possibility of the interference of the seat apparatus 1 with the other components of the vehicle can be prevented even when the returning operation of the seat cushion 2 is performed. In step S6, completion of the returning operation of the seat cushion 2 is determined. If the returning operation of the seat cushion 2 is not completed, the procedure returns to steps S2 and S4 to continue the returning operation of the seat cushion 2.

In contrast, if the returning operation of the seat cushion 2 is completed and the seat cushion 2 is locked at the seating position P1 (step S6: YES), the returning operation of the seatback 3 is started and the stand angle of the seatback 3 is gradually increased in step S8. Then, completion of the returning operation of the seatback 3 is determined in step S10. If the returning operation of the seatback 3 is not completed, the procedure returns to step S2 to increase the stand angle of the seatback 3. On this occasion, because the returning operation of the seat cushion 2 is completed and the seat cushion motor 402 is not required to be driven, a command value from the ECU 600 to the seat cushion motor 402 is zero. When the returning operation of the seatback 3 is completed (step S10: YES), the returning operation of the seat apparatus 1 is terminated. Alternatively, or in addition, the operation starting time of the seat cushion 2 and the operation starting time of the seatback 3 may temporally be different in a condition where the movement of the seat cushion 2 and the movement of the seatback 3 are temporally overlapped.

A returning operation 2 will be explained hereinafter with reference to FIGS. 9 and 10. As illustrated in FIG. 9, in step S2 of the returning operation 2, the operation state of the operating switch 100 is read. If the operating switch 100 is turned on to operate the seat cushion 2 and the seatback 3 in the returning direction, the returning operation of the seat cushion 2 is started prior to the returning operation of the seatback 3 in step S4 because the small stand angle of the seatback 3 may be required at an initial stage of the returning operation 2. Then, an elapsed time of the returning operation of the seat cushion 2 is determined if a time T has passed from a starting time of the returning operation of the seat cushion 2 in step S6. If the time T has not passed, because of the possibility of the interference of the seat apparatus 1 with the other components of the vehicle, the procedure returns to steps S2 and S4 to continue the returning operation of the seat cushion 2 without performing the returning operation of the seatback 3. In contrast, when the time T has passed from the starting time of the retuning operation of the seat cushion 2, because the possibility of the interference of the seat apparatus with the other components of the vehicle can be avoided, the returning operation of the seatback 3 is started and the stand angle of the seatback 3 is gradually increased in step S8. Then, the completion of the returning operation of the seat cushion 2 and the seatback 3 is determined in step S10. If the returning operation of at least one of the seat cushion 2 and the seatback 3 is not completed (step S10: NO), the procedure returns to step S2. In a condition where the completion of the storing operation of the seatback 3 and the completion of the storing operation of the seat cushion 2 are temporally different, a command value is transmitted to the motor of the at least one of the seat cushion 2 and the seatback 3, the storing operation of which in not completed, for driving. On this occasion, a command value transmitted to the motor of the other one of the seat cushion 2 and the seatback 3, the storing operation of which is completed, is zero. If the returning operations of both the seat cushion 2 and the seatback 3 are completed (step S10: YES), the returning operation of the seat apparatus 1 is terminated. The time T of the returning operation 2 is set so that the interference of the seat apparatus 1 with the other components of the vehicle is not generated even when the returning operation of the seatback 3 is performed. The time T is memorized in the memory of the ECU 600 with respect to each type of vehicle.

A returning operation 3 will be explained hereinafter with reference to FIGS. 9 and 10. The returning operation 3 performs the steps basically similar to that of the retuning operation 2. However, in the returning operation 3, the position of the seat cushion 2 is determined if the present position of the seat cushion 2 reaches a predetermined intermediated position B in step S6. If the present position of the seat cushion 2 is not reached to the intermediate position B (step S6: NO), because the possibility of the interference of the seat apparatus 1 with the other components of the vehicle may occur when the seat back 3 is moved rearward, the procedure returns to step S2 without performing the returning operation of the seatback 3 and continues the returning operation of the seat cushion 2. In contrast, if the present position of the seat cushion 2 reaches the intermediate position B (step S6: YES), because the possibility of the interference of the seat apparatus 1 with the other components of the vehicle can be avoided, the returning operation of the seatback 3 is started and the stand angle of the seatback 3 is increased in step S8. Then, the completion of the returning operation of the seat cushion 2 and the seatback 3 is determined in step S10. If the returning operations of the both seat cushion 2 and the seatback 3 are completed, the returning operation of the seat cushion 1 is terminated. The intermediated position B of the returning operation 3 is set so that the interference of the seat apparatus 1 is not generated even when the returning operation of the seatback 3 is performed. The intermediated position B is memorized in the memory of the ECU 600 with respect to each type of vehicle.

Figure 10:
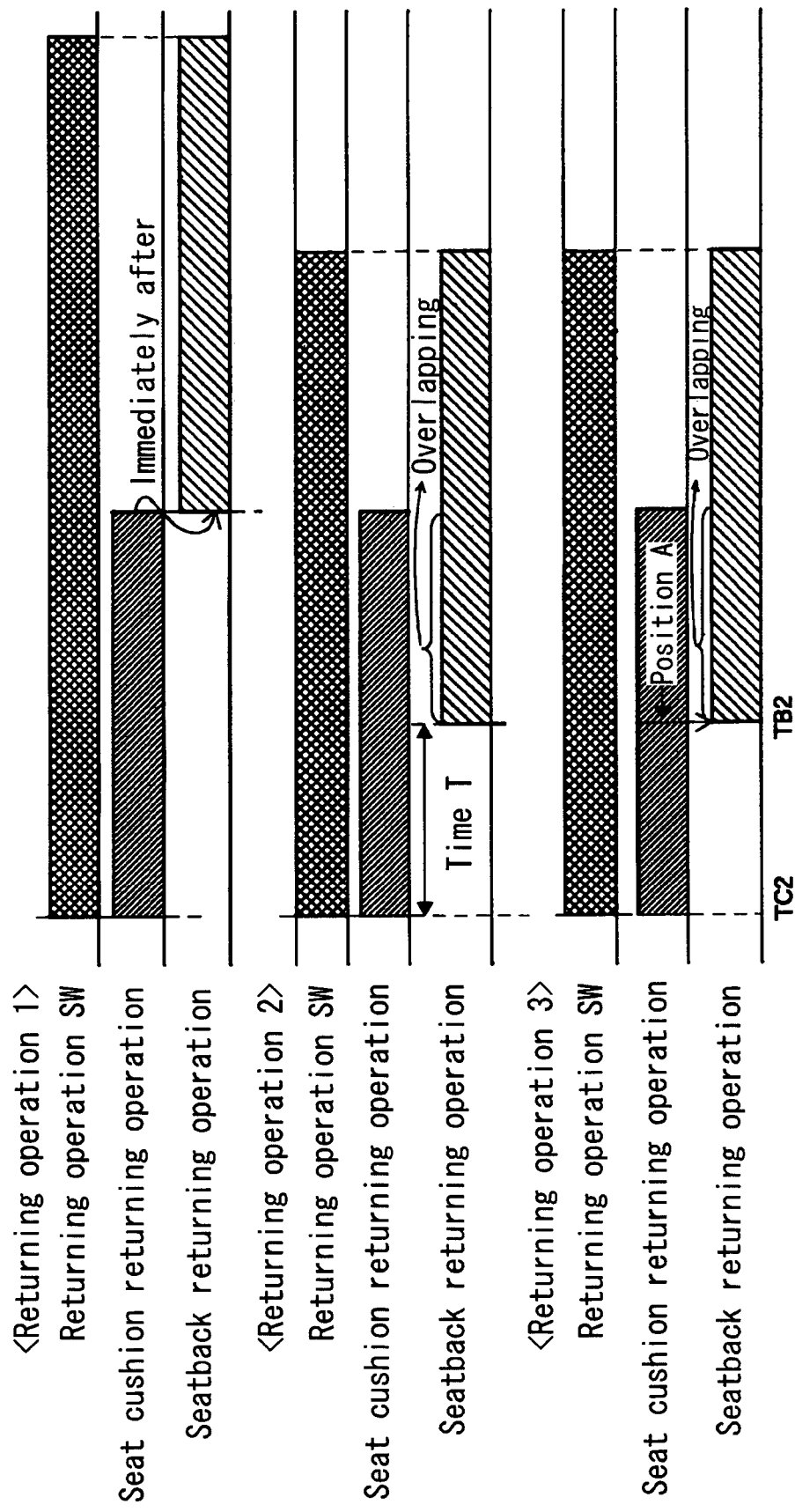
FIG. 10 is a timing chart illustrating the returning operations 1, 2, and 3.

As can be seen from FIG. 10, the returning operation of the seat cushion 2 is preferentially started relative to the returning operation of the seatback 3 in the returning operation 1. Then, the returning operation of the seatback 3 is promptly started immediately after the completion of the returning operation of the seat cushion 2 without interruption. The aforementioned control can easily be performed because the seat cushion motor 402 and the seatback motor 400 are independently driven. Therefore, the interference of the seat apparatus 1 with the other components of the vehicle can be prevented while reducing the entire operating time required for the returning operation 1. Further, as can be seen from FIG. 10, because the movement of the seat cushion 2 and the movement of the seatback 3 are temporally overlapped with each other, the entire operating time of the returning operations 2 and 3 can be reduced relative to the returning operation 1. Moreover, because an operation starting time TC2 of the seat cushion 2 and an operation starting time TB2 of the seatback 3 are temporally different in a direction in which the interference can be prevented, the interference of the seat apparatus 1 with the other components of the vehicle can advantageously be prevented.

(Storing Operation 4)

Figure 11:
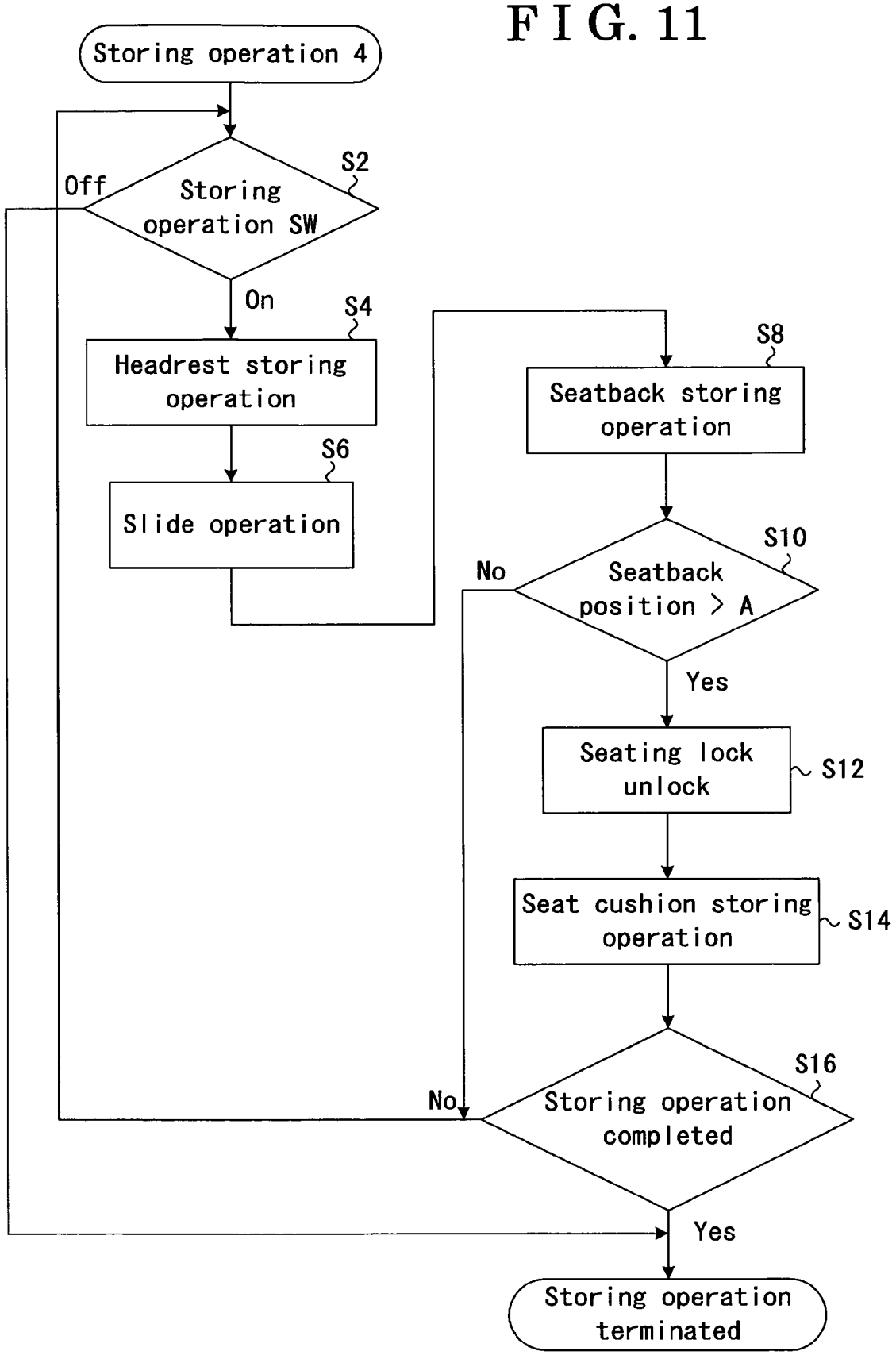
FIG. 11 is a flow chart illustrating a storing operation 4.

A storing operation 4 will be explained hereinafter with reference to FIGS. 11 and 12. As illustrated in FIG. 11, in step S2 of the storing operation 4, the operation state of the operating switch 100 is read for determining if the seat cushion 2 and the seatback 3 are operated in the storing direction. If the operating switch 100 is turned on to operate the seat cushion 2 and the seatback 3 in the storing direction, a storing operation of the headrest 37 is performed in a direction in which the headrest 37 is stored in the headrest storage position in step S4. Further, a slide operation of the frame 2' of the seat cushion 2 is performed in a direction in which the interference of the seat apparatus 1 with the other components of the vehicle is avoided in step S6. The storing operation of the frame 2' of the seat cushion 2 is performed prior to the storing operation of the seat cushion 2. Accordingly, an interference of the headrest 37, of the frame 2' of the seat cushion 2, and of the seat cushion 2 with the other components of the vehicle can advantageously be prevented. Next, the storing operation of the seatback 3 is started prior to the storing operation of the seat cushion 2 and the seatback 3 is folded in step S8 in order to reduce the stand angle of the seatback 3 at early stages in the storing operation. Then, the position of the seatback 3 is determined if the present position of the seatback 3 reaches the intermediate position A in step S10. The intermediate position A is preliminarily set so that the interference of the seat apparatus 1 with the other components of the vehicle is not generated even when the seat cushion 2 is moved. The intermediate position A is memorized in the memory of the ECU 600 with respect to each type of vehicle. If the present position of the seatback 3 is not reached to the intermediate position A (step S10: NO), because of the highly possibility of the interference of the seat apparatus 1 with the other components of the vehicle due to the large stand angle of the seatback 3, the procedure returns to step S2, without performing the storing operation of the seat cushion 2, to continue the storing operation of the headrest 37, to continue the slide operation of the frame 2', and to continue the storing operation of the seatback 3 in a direction in which the interference thereof with the other components of the vehicle can be prevented.

In contrast, if the present position of the seatback 3 reaches the intermediate position A (step S10: YES), because the possibility of the interference of the seat apparatus 1 with the other components of the vehicle can be avoided due to the small stand angle of the seatback 3, the lock devices 7 and 8 are unlocked in step S12 and the seat cushion 2 comes into a state in which the seat cushion 2 can be detached from the seating position P1 in order to perform the storing operation of the seat cushion 2. Next, the storing operation of the seat cushion 2 is started in step S14. Then, the completion of all storing operations is determined in step S16. If any one of the storing operations is not completed (step S16: NO), the procedure returns to step S2. On this occasion, a command value transmitted to the motors, the storing operation of which is completed, is zero. When the all storing operations are completed (step S 16: YES), the storing operation of the seat apparatus 1 is terminated.

Figure 12:
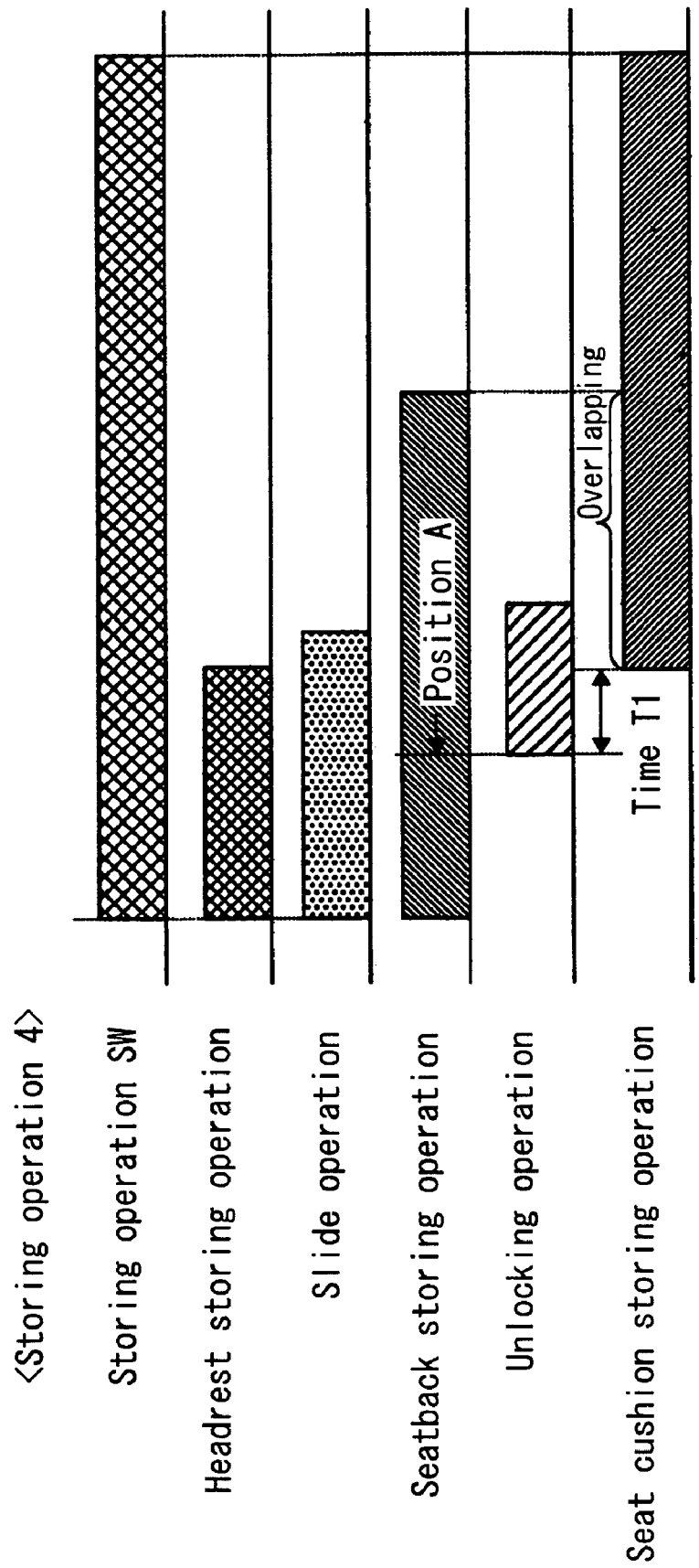
FIG. 12 is a timing chart illustrating the storing operation 4.

As can be seen from FIG. 12, the storing operation of the headrest 37, the slide operation of the frame 2' of the seat cushion 2, and the storing operation of the seatback 3 are temporally overlapped one another in the storing operation 4. Therefore, the entire operating time can be reduced while preventing the interference of the seat cushion 2 and the seatback 3 with the other components of the vehicle. Further, when the present position of the seatback 3 is not reached to the intermediate position A, because of the possibility of the interference of the seat apparatus 1 with the other components of the vehicle, the operation of the seat cushion 2 is not performed. However, if the present position of the seatback 3 reaches the intermediated position A, because the possibility of the interference of the seat apparatus 1 with the other components of the vehicle is avoided due to the small stand angle of the seatback 3, the unlock operation of the loch devices 7 and 8 is started. As illustrated in FIG. 12, the storing operation of the seat cushion 2 is started after a time $T_1$ has passed from a start of the unlock operation. Accordingly, in the storing operation 4, the storing operation of the seatback 3 is performed prior to the storing operation of the seat cushion 2 and the stand angle of the seatback 3 is reduced at early stages for preventing the interference of the seat apparatus 1 with the other components of the vehicle. Further, because the operation of the seatback 3 and the operation of the seat cushion 2 are temporally overlapped with each other in the storing operation 4, the entire operating time can be reduced.

(Storing Operation 5)

Figure 13:
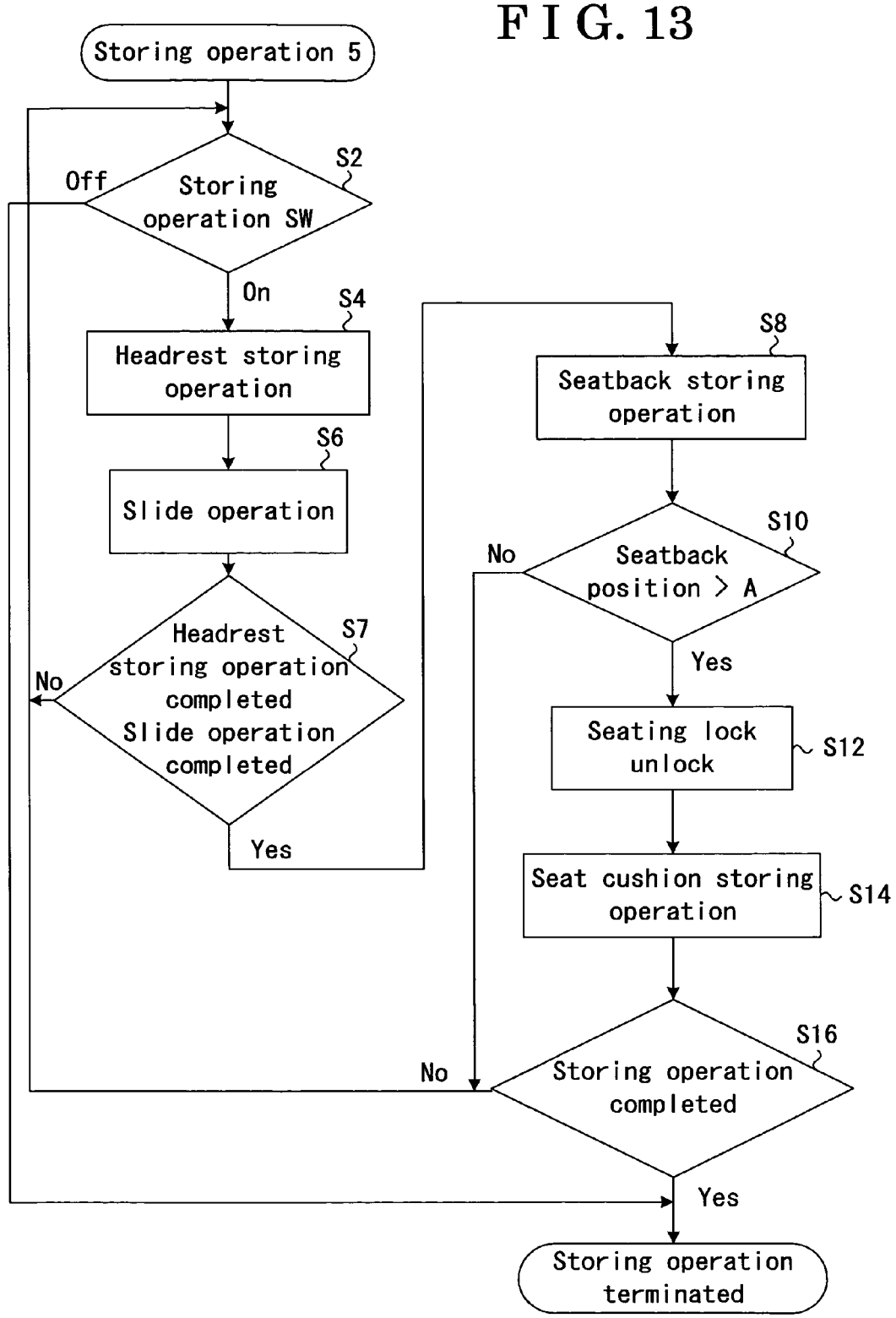
FIG. 13 is a flow chart illustrating a storing operation 5.

A storing operation 5 will be explained hereinafter with reference to FIGS. 13 and 14. A flow chart of the storing operation 5 illustrated in FIG. 13 is basically similar to that of the storing operation 4 illustrated in FIG. 11. More specifically, after step S6, the completion of the storing operation of the headrest 37 and the slide operation of the frame 2' of the seat cushion 2 is determined in step S7. If the operation of at least one of the headrest 37 and the fame 2' of the seat cushion 2 is not completed (step S7: NO), the procedure returns to step S2 to continue the operation. The storing operation of the headrest 37 and the slide operation of the frame 2' of the seat cushion 2 are preferentially performed and the storing operation of the seatback 3 is performed after the completion of the operations of the headrest 37 and the frame 2'. Therefore, capability of preventing the interference of the seat apparatus 1 with the other components of the vehicle can further be increased even when the vehicle compartment has a small space. When the storing operation of the headrest 37 and slide operation of the fame 2' of the seat cushion 2 are completed (step S7: YES), the storing operation of the seatback 3 is started prior to the storing operation of the seat cushion 2 in step S8. Thereby, the stand angle of the seatback 3 can be reduced at early stages in the storing operation. Further, the storing operation of the seat apparatus 1 is completed through the steps S10, S12, S14 and S16.

Figure 14:
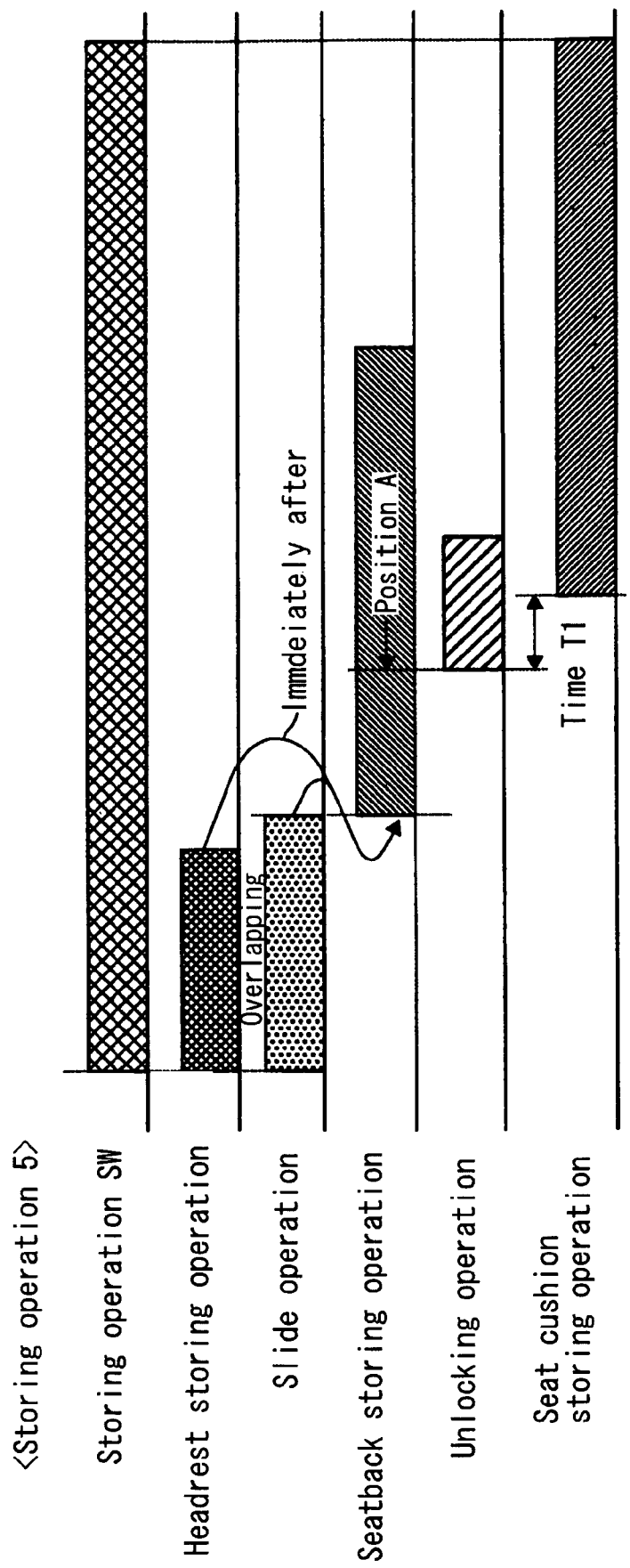
FIG. 14 is a timing chart illustrating the storing operation 5.

As can be seen from a timing chart of FIG. 14, because the storing operation of the headrest 37 and the slide operation of the frame 2' of the seat cushion 2 are temporally overlapped with each other in the storing operation 5, the entire operating time can be reduced. Further, the storing operation of the seatback 3 is promptly started immediately after the completion of the storing operation of the headrest 37 and the completion of the slide operation of the frame 2' of the seat cushion 2 without interruption. Therefore, the entire operating time can be reduced. Further, when the present position of the seatback 3 reaches the intermediate position A, because the possibility of the interference of the seat apparatus 1 with the other components of the vehicle is avoided due to the small stand angle of the seatback 3, the unlock operation of the lock devices 7 and 8 is started. The storing operation of the seat cushion 2 is started after the time $T_1$ has passed from the start of the unlock operation. As illustrated in FIG. 14, because the operation of the seatback 3 and the operation of the seat cushion 2 are temporally overlapped with each other, the entire operating time can be reduced in the storing operation 5.

(Returning Operation 4)

Figure 15:
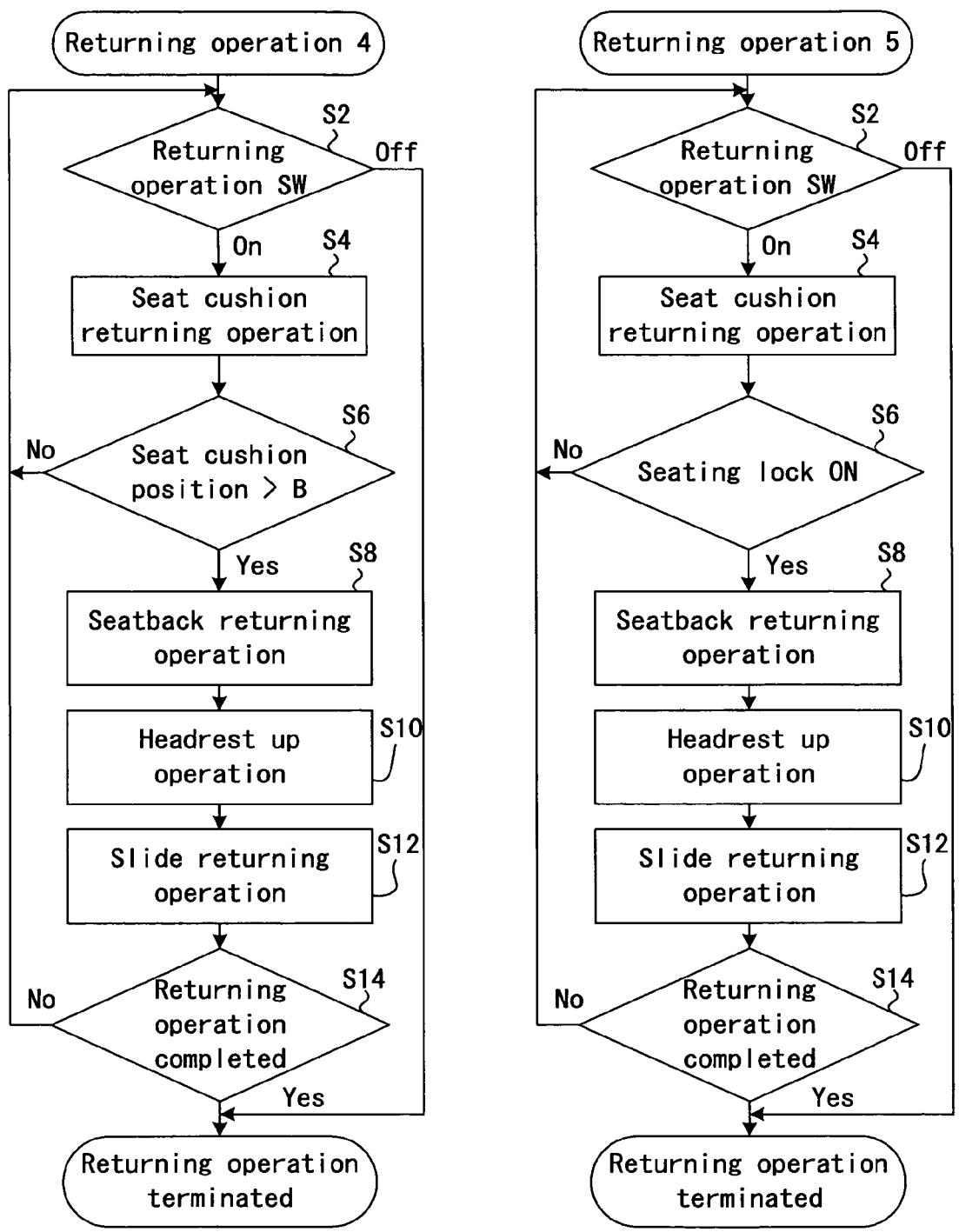
FIG. 15 is a flow chart illustrating returning operations 4 and 5.

A returning operation 4 will be explained hereinafter with reference to FIGS. 15 and 16. As illustrated in FIG. 15, in step S2 of the returning operation 4, the operation state of the operating switch 100 is read for determining if the seat cushion 2 and the seatback 3 are operated in the returning direction. If the operating switch 100 is turned on to operate the seat cushion 2 and the seatback 3 in the returning direction, the returning operation of the seat cushion 2 is performed prior to the returning operation of the seatback 3 in step S4. It is because, at the storing position P2, the seatback 3 is placed on the seat cushion 2 and the stand angle of the seatback 3 is small. Thus, the interference of the seatback 3 may not occur. Accordingly, the returning operation of the seat cushion 2 is performed in the initial stages.

Then, the position of the seat cushion 2 is determined if the present position of the seat cushion 2 reaches the intermediate position B in step S6. If the present position of the seat cushion 2 is not reached to the intermediate position B (step S6: NO), because of the possibility of the interference of the seat apparatus 1 with the other component of the vehicle, the procedure returns to step S2 without operating the seatback 3 in the returning direction and continues the returning operation of the seat cushion 2. In contrast, if the present position of the seat cushion reaches the intermediate position B (step S6: YES), because the possibility of the interference of the seat apparatus 1 with the other components of the vehicle is avoided, the returning operation of the seatback 3 is started and the stand angle of the seatback 3 is increased in step S8. Then, an up operation of the headrest 37 to the headrest using position is started in step S10 and the slide returning operation of the frame 2' of the seat cushion 2 is started in step S12. Accordingly, the returning operation of the seat cushion 2, the up operation of the headrest 37, and the slide operation of the frame 2' of the seat cushion 2 are started after the possibility of the interference of the seat apparatus 1 with the other components of the vehicle is avoided. The intermediate position B is preliminarily set so that the interference of the seat apparatus 1 with the other components of the vehicle is not generated even when the seat apparatus 1 is moved. The intermediate position B is memorized in the memory of the ECU 600 with respect to each type of vehicle.

Then, the completion of all returning operations is determined in step S14. If the operation of at least one of the seat cushion 2, the headrest 37, and the frame 2' of the seat cushion 2 is not completed (step S14: NO), the procedure returns to step S2 to continue the operation of the at least one of the seatback 3, the seat cushion 2, the headrest 37, and the frame 2' of the seat cushion 2. On this occasion, a command value is transmitted to the motor of the at least one of the seatback 3, the seat cushion 2, the headrest 37, and the frame 2', the operation of which in not completed, for driving. Further, a command value transmitted to the motor, the storing operation of which is completed, is zero. If all the returning operations are completed (step S14: YES), the returning operation of the seat apparatus 1 is terminated.

Figure 16:
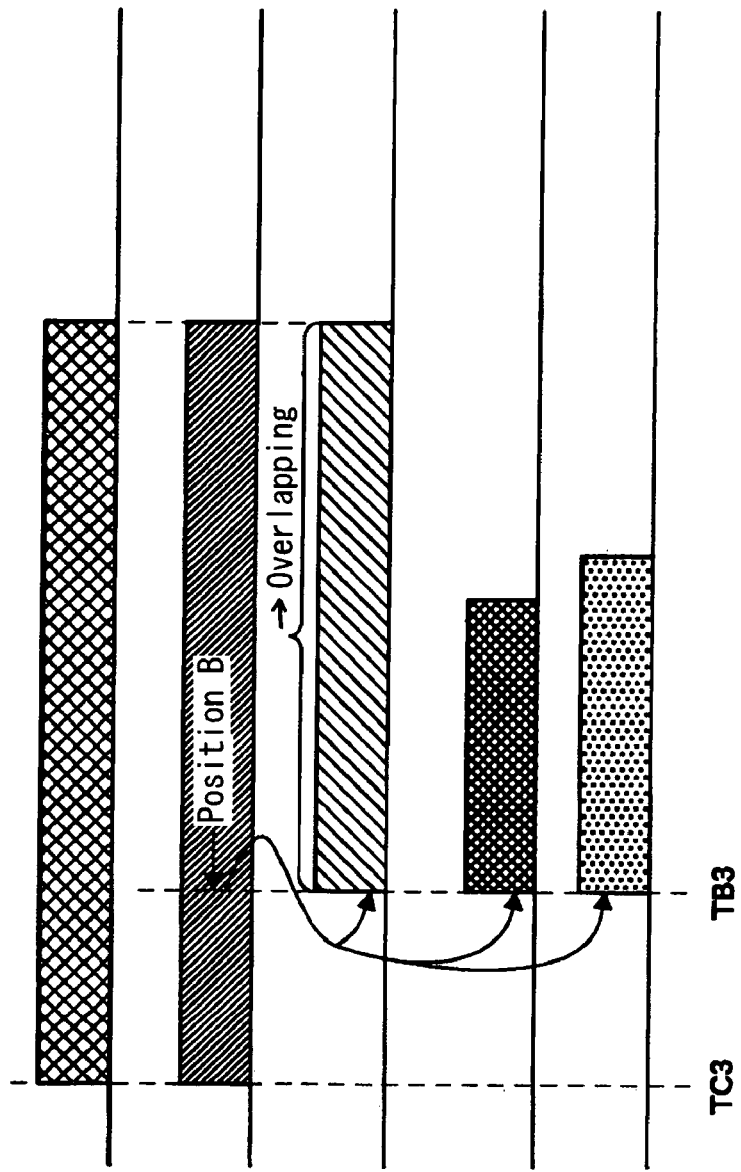
FIG. 16 is a timing chart illustrating the returning operation 4.

As can be seen from FIG. 16, because the returning operation of the seat cushion 2 and the returning operation of the seatback 3 are temporally overlapped with each other in the returning operation 4, the entire operating time can be reduced. In addition, because the operation of the headrest 37 and the slide operation of the frame 2' of the seat cushion 2 are temporally over lapped with the returning operation of the seat cushion 2 and the returning operation of the seatback 3, the entire operating time can further be reduced. As illustrated in FIG. 16, an operation time of the headrest 37 is shorter than a returning operation time of the seatback 3 or a returning operation time of the seat cushion 2. Further, a slide operation time of the frame 2' of the seat cushion 2 is shorter than the returning operation time of the seatback 3 or the returning operation time of the seat cushion 2. In the returning operation 4, an operation starting time TC3 of the seat cushion 2 and an operation starting time TB3 of the seatback 3 are temporally different in a condition where the movement of the seat cushion 2 and the movement of the seatback are temporally overlapped with each other. Accordingly, the interference of the seat cushion 2 and the seatback 3 are advantageously prevented while reducing the movement time.

(Returning Operation 5)

A returning operation 5 will be explained hereinafter with reference to FIGS. 15 and 17. A flow chart of the returning operation 5 is basically similar to that of the returning operation 4. As illustrated in FIG. 15, in step S2 of the returning operation 5, the operation state of the operating switch 100 is read for determining if the seat cushion 2 and the seatback 3 are operated in the returning direction. If the operating switch 100 is turned on to operate the seat cushion 2 and the seatback 3 in the returning direction, the returning operation of the seat cushion 2 is performed prior to the returning operation of the seatback 3 in step S4. At this stage, the stand angle of the seatback 3 is small and the headrest 37 and the frame 2' of the seat cushion 2 are stored in the storage position. Next, the status of the seat cushion 2 is determined if the seat cushion 2 is reached and locked at the seating position P1 in step S6. The step S6 serves as a lock determining means for determining if the seat cushion 2 moved from the storage position P2 is reached and locked at the seating position P1. When the seat cushion 2 reaches the seating position P1 from the storage position P2, the lock devices 7 and 8 are automatically locked and the seat cushion 2 is automatically locked to the floor 4 at the seating position P1. If the seat cushion 2 is not reached to the seating position P1 (step S6: NO), the procedure returns to step S2 to continue the returning operation of the seat cushion 2 until the seat cushion 2 is locked at the seating position P1.

In contrast, when the seat cushion 2 reaches the seating position P1 (step S6: YES), the returning operation of the seatback 3 is started in step S8, the up operation of the headrest 37 is started in step S10, and the slide operation of the frame 2' of the seat cushion 2 is started in step S12. Then, the completion of the all operations is determined in step S14. If the operation of at least one of the seat cushion 2, the seatback 3, the headrest 37, and the frame 2' is not completed, the procedure returns to step S2 to continue the operation of the at least one of the seat cushion 2, the seatback 3, the headrest 37, and the frame 2' of the seat cushion 2. On this occasion, a command value is transmitted to the motor of the at least one of the seat cushion 2, the seatback 3, the headrest 37, and the frame 2', the operation of which in not completed, for driving. Further, a command value transmitted to the motor, the storing operation of which is completed, is zero. If all the returning operations are completed (step S14: YES), the returning operation of the seat apparatus 1 is terminated.

Figure 17:
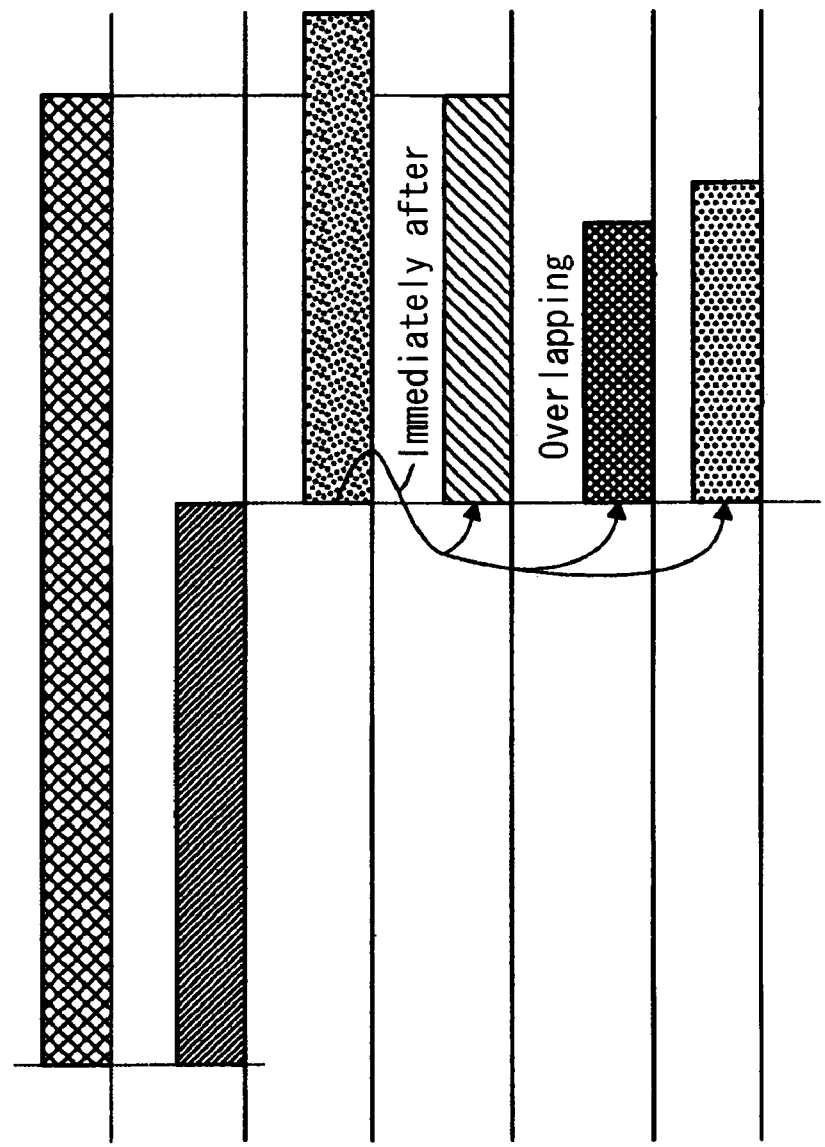
FIG. 17 is a timing chart illustrating the returning operation 5.

Because the seat cushion motor 402 and the seatback motor 400 are independently driven, the returning operation of the seatback 3 can promptly be operated immediately after the completion of the returning operation of the seat cushion 2 without intervals as can be seen from FIG. 17. Therefore, the entire operating time can advantageously be reduced. Further, because the operation of the headrest 37, the slide operation of the seat cushion 2, and the returning operation of the seatback 3 are temporally overlapped with each other, the entire operating time can further be reduced. Alternatively, or in addition, the operation of the seatback 3 and the operation of the seat cushion 2 may temporally be overlapped with each other in a condition where the operation starting time of the seatback 3 and the seat cushion 2 are temporally different.

(Storing Operation Speed Control a)

Figure 18:
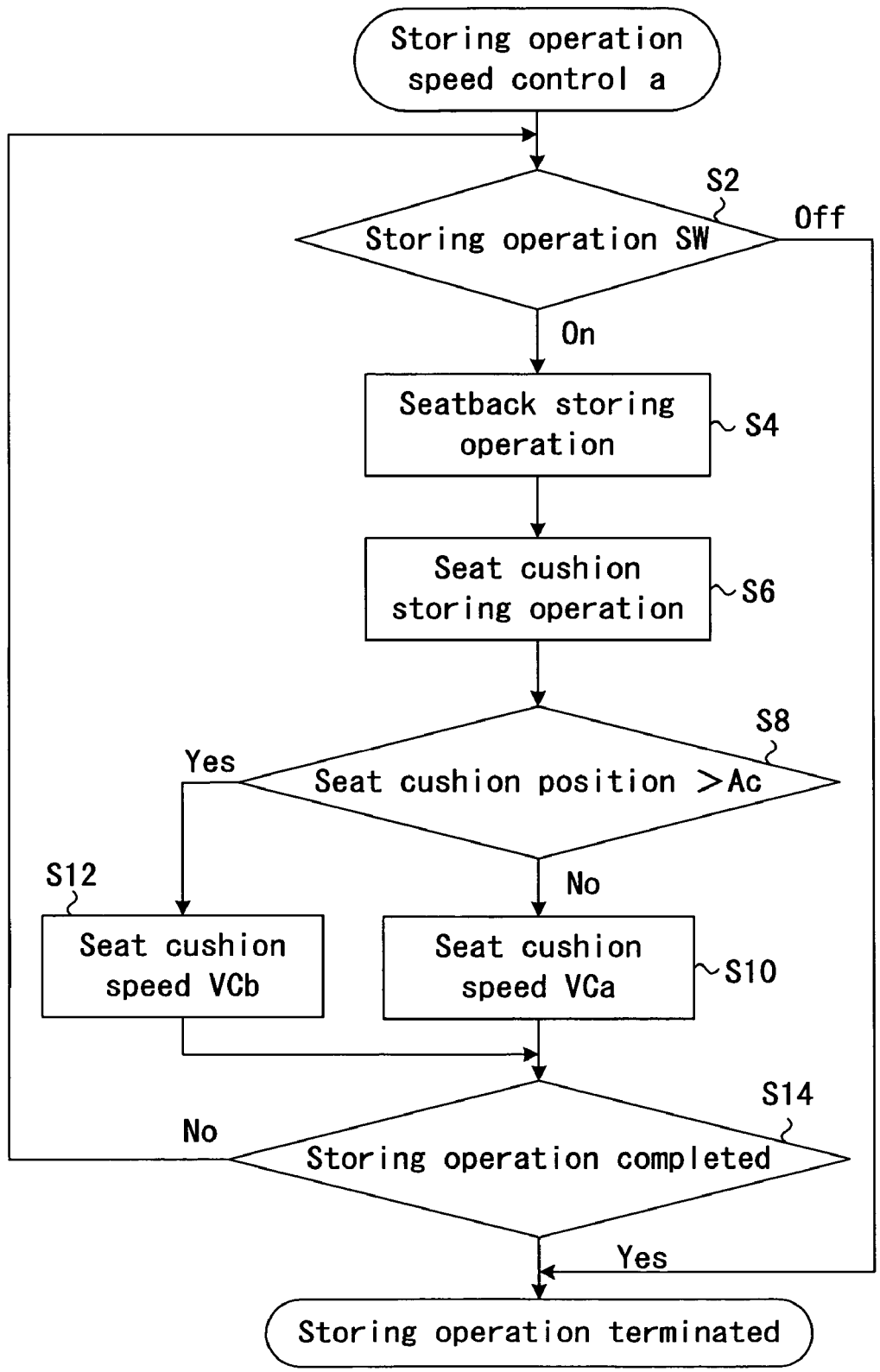

A storing operation speed control a will be explained hereinafter with reference to FIGS. 18 and 19. As illustrated in FIG. 18, the entire operating time is reduced in the storing operation speed control a by temporally overlapping the operation of the seatback 3 and the seat cushion 2. In the storing operation speed control a, the operation state of the operating switch 100 is read in step S2. If the operating switch 100 is turned on to operate the seat cushion 2 and the seatback 3 in the storing operation, the storing operation of the seatback 3 is started in step S4 and the storing operation of the seat cushion 2 is started in step S6. Accordingly, the storing operation of the seatback 3 and the storing operation of the seat cushion 2 are performed at about the same time.

Then, it is determined if the present position of the seat cushion 2 reaches the intermediate position Ac in step S8. The intermediate position Ac is set so that the interference of the seat apparatus 1 with the other components of the vehicle is not generated even when an operating speed of the seat cushion 2 is increased. The intermediate position Ac is memorized in the memory of the ECU 600 with respect to each type of vehicle. If the present position of the seat cushion 2 is not reached to the intermediate position Ac (step S8: NO), because of the possibility of the interference of the seat apparatus 1 with the other components of the vehicle, the operating speed of the seat cushion 2 is set at VCa (VCa is relatively slower than VCb). It is because, at this point, the stand angle of the seatback 3 may still be large since the storing operation of the seatback 3 and the storing operation of the seat cushion 2 are started at about the same time. Therefore, if the operating speed of the seat cushion 2 is not at lower speed, the interference of the seat cushion 1 with the other components of the vehicle may be generated. In contrast, if the present position of the seat cushion 2 reaches the intermediate position Ac (step S8: YES), the interference of the seat apparatus 1 can be avoided even when the operating speed of the seat cushion 2 is increased. Therefore, the operating speed of the seat cushion 2 is set at VCb (VCb is relatively faster than VCa) in step S12 for reducing the entire operation time. The step S8 severs as a position determining means for determining if a moved position of the seat cushion 2 reaches a predetermined position on the basis of physical quantity regarding the seat cushion 2 detected by means of the physical quantity detecting means. Further, the step S12 serves as a speed change command means which outputs a command for changing (increasing) the operating speed of the seat cushion 2 from an initial operating speed. Then, the completion of the storing operation of the seat apparatus 1 is determined in step S14. If at least one of the storing operations is not completed (step S14: NO), the procedure returns to step S2 to perform at least one of the storing operations, which is not completed. If the storing operation of the seat apparatus 1 is completed (step S14: YES), the storing operation is terminated.

Figure 19:
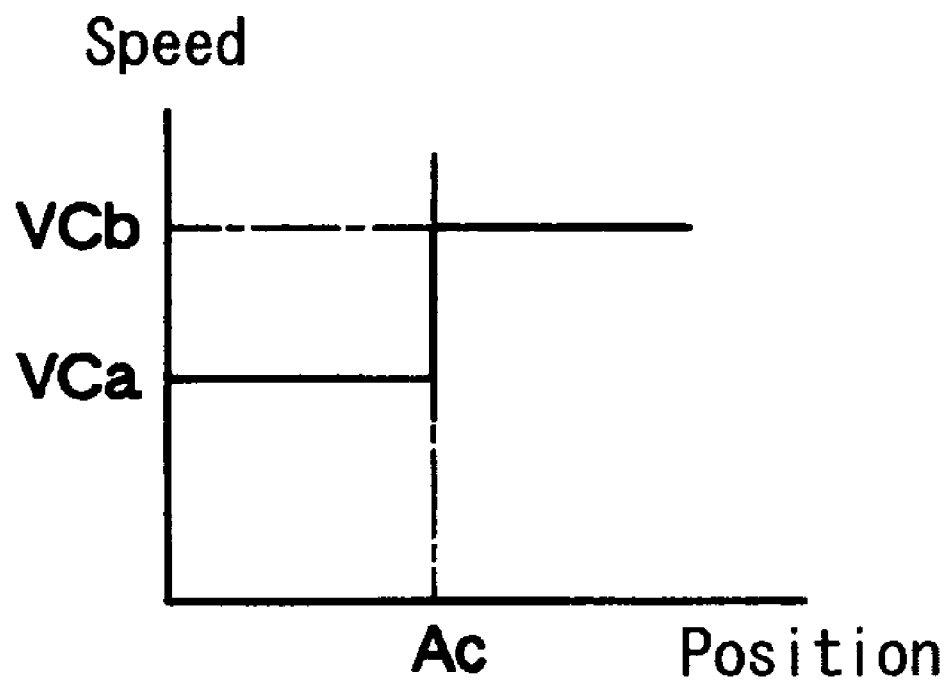

In the storing operation speed control a, the operating time is divided into an early operation period and a later operation period as illustrated in FIG. 19. The operating speed of the seat cushion 2 is set at relatively lower speed in the early operation period and the operating speed of the seat cushion 2 is set at relatively higher speed in the later operation period. Alternatively, or in addition, the operating time may be divided into the early operation period, a middle operation period and the later operation period. On this occasion, the operating speed of the seat cushion 2 may be set at relatively lower speed in the early operation period and the middle operation period and the operating speed of the seat cushion 2 may be increased in the later operation period so that the operating speed in the later operation period becomes relatively faster than the operating speed in the early operation period. Further, alternatively, or in addition, the operating speed of the seat cushion 2 may be set at relatively lower speed in the early operation period and the operating speed of the seat cushion 2 may be increased in the middle operation period and the later operation period so that the operating speed in the later operation period becomes relatively faster than the operating speed in the early operation period.

(Storing Operation Speed Control b)

Figure 20:
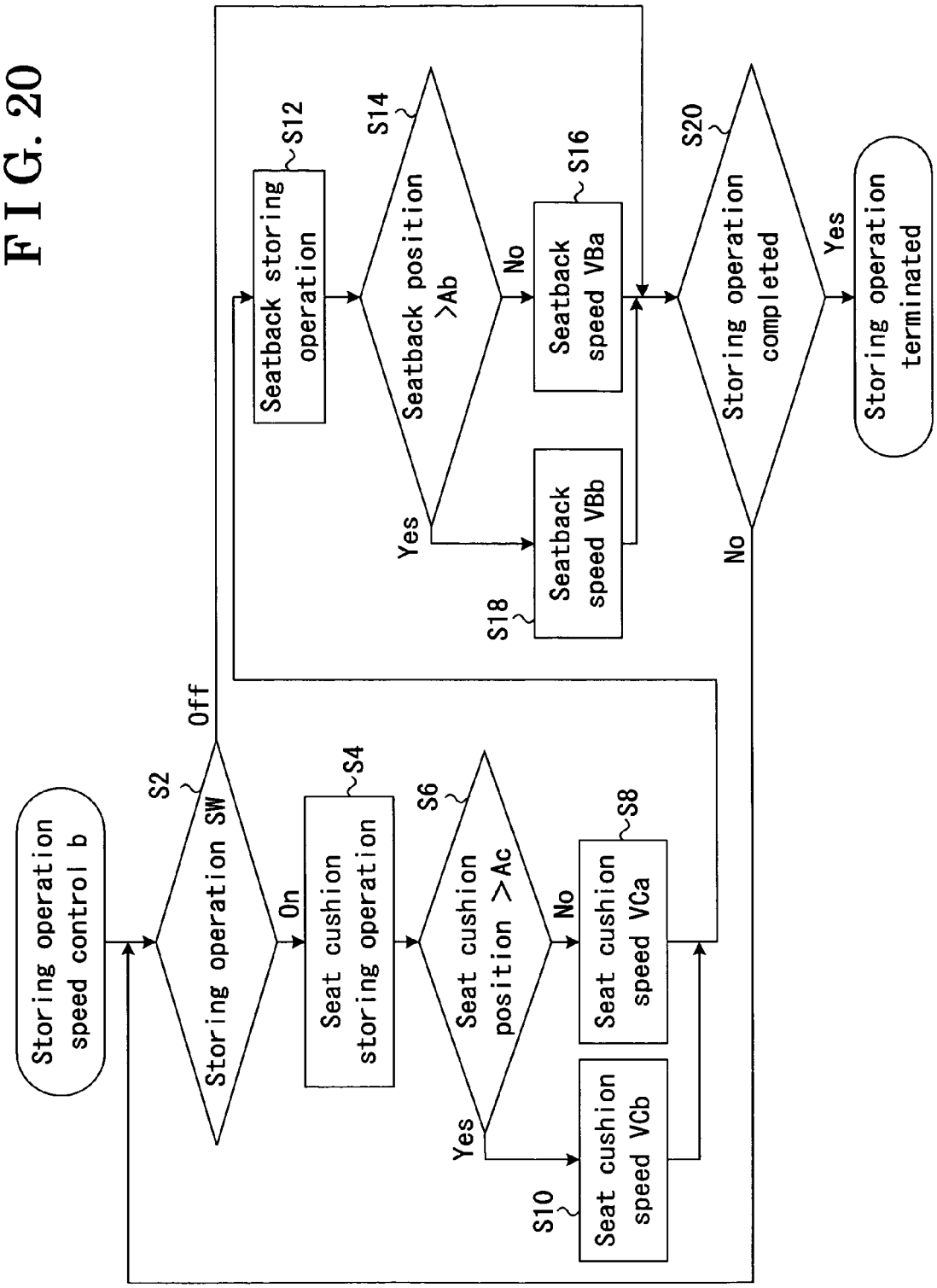
FIG. 20 is a flow chart illustrating a storing operation speed control b.
Figure 21:
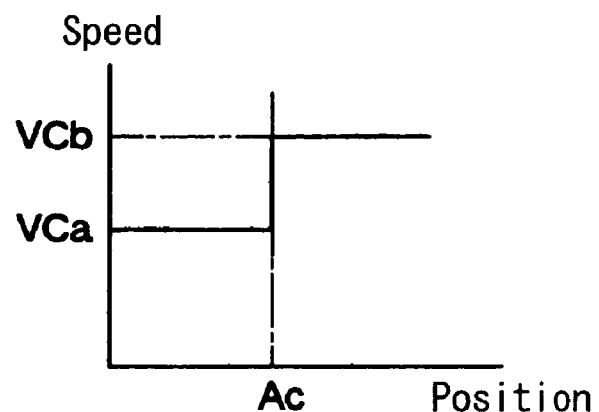
FIG. 21 is a graph indicating a relation between operating speed VCa and VCb of the seat cushion and a position of the seat cushion in the storing operation speed control b.
Figure 22:
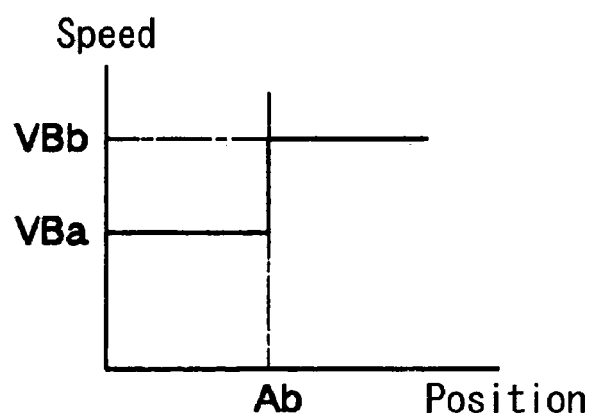
FIG. 22 is a graph indicating a relation between operating speed VBa and VBb of a seatback and a position of the seatback in the storing operation speed control b.

A storing operation speed control b will be explained hereinafter with reference to FIGS. 20-22. As illustrated in FIG. 20, the entire operating time is reduced in the storing operation speed control b by temporally overlapping the operation of the seatback 3 and the seat cushion 2. In the storing operation speed control b, the operation state of the operating switch 100 is read in step S2. If the operating switch 100 is turned on to operate the seat cushion 2 and the seatback 3 in the storing operation, the storing operation of the seat cushion 2 is started in step S4. Then, the position of the seat cushion 2 is determined if the present position of the seat cushion 2 reaches the intermediate position Ac in step S6. The intermediate position Ac is set so that the interference of the seat apparatus 1 with the other components of the vehicle is not generated even when the operating speed of the seat cushion 2 is increased. The intermediate position Ac is memorized in the memory of the ECU 600. If the present position of the seat cushion 2 is not reached to the intermediate position Ac (step S6: NO), because of the possibility of the interference of the seat apparatus 1 with the other components of the vehicle, the operating speed of the seat cushion 2 is set at VCa in step S8. The operating speed VCa is relatively slower than the operating speed VCb and the interference of the seat apparatus 1 with the other components of the vehicle can thereby be avoided. In contrast, when the present position of the seat cushion 2 reaches the intermediate position Ac (step S6: YES), because the possibility of the interference of the seat apparatus 1 with the other components of the vehicle can be avoided, the operating speed of the seat cushion 2 is set at VCb (VCb is relatively faster than VCa) in step S10. Accordingly, the entire operating time can be reduced.

Further, the storing operation of the seatback 3 is started in step S12 while performing the storing operation of the seat cushion 2. Thereby, the operation of the seat cushion 2 and the operation of the seatback 3 are temporally be overlapped with each other for reducing the entire operating time. Then, the position of the seatback 3 is determined if the present position of the seatback 3 reaches the intermediate position Ab in step S14. The intermediate position Ab is set so that the interference of the seat apparatus 1 with the other components of the vehicle is avoided even when the operating speed of the seatback 3 is increased. The intermediate position Ab is memorized in the memory of the ECU 600. If the present position of the seatback 3 is not reached to the intermediate position Ab (step S14: NO), because the stand angle of the seatback 3 is large, an operating speed of the seatback 3 is set at VBa (VBa is relatively slower than VBb) for preventing the interference of the seat apparatus 1 with the other components of the vehicle.

In contrast, when the present position of the seatback 3 reaches the intermediate position Ab (step S14: YES), because the possibility of the interference of the seat apparatus 1 with the other components of the vehicle is avoided due to the small stand angle of the seatback 3, the operating speed of the seatback 3 is set at VBb (VBb is relatively faster than VBa) for reducing the movement time. Then, the completion of the storing operation of the seat apparatus 1 is determined in step S20. If at least one of the operations is not completed (step S20: NO), the procedure returns to step S2 to continue the at least one of the operations, which is not completed. In contrast, if the storing operation of the seat apparatus 1 is completed (step S20: YES), the storing operation of the seat apparatus 1 is terminated.

The step S6 severs as the position determining means for determining if the moved position of the seat cushion 2 reaches the predetermined position on the basis of the physical quantity regarding the seat cushion 2 detected by means of the physical quantity detecting means. Further, the step S10 serves as the speed change command means which outputs the command for changing (increasing) the operating speed of the seat cushion 2 from the initial operating speed. Moreover, in the storing operation speed control b, the step S14 serves as a position determining means for determining if a moved position of the seatback 3 reaches a predetermined position on the basis of the physical quantity regarding the seatback 3 detected by means of the physical quantity detecting means. The step S18 serves as a speed change command means which outputs a command for changing (increasing) the operating speed of the seatback 3 from an initial operating speed. As illustrated in FIG. 21, the operating speed of the seat cushion 2 increases in the later operation period relative to the early operation period in the storing operation speed control b. Further, as illustrated in FIG. 22, the operating speed of the seatback 3 increases in the later operation period relative to the early operation period in the storing operation speed control b. According to the embodiment of the present invention, because the operating speed of the seat cushion 2 increases in the course of the operation as well as the operating speed of the seatback 3 increases in the course of the operation, the entire operating time can further be reduced without causing the interference of the seat apparatus 1 with the other components of the vehicle. In the storing operation speed control b according to the embodiment of the present invention, the operation of the seat cushion 2 and the operation of the seatback 3 are started at about the same time. However, the present invention is not limited thereto. Alternatively, or in addition, the operation starting time of the seatback 3 and the seat cushion 2 may temporally be different in a condition where the operation of the seat cushion 2 and the operation of the seatback 3 are overlapped with each other.

(Storing Operation Speed Control c)

Figure 23:
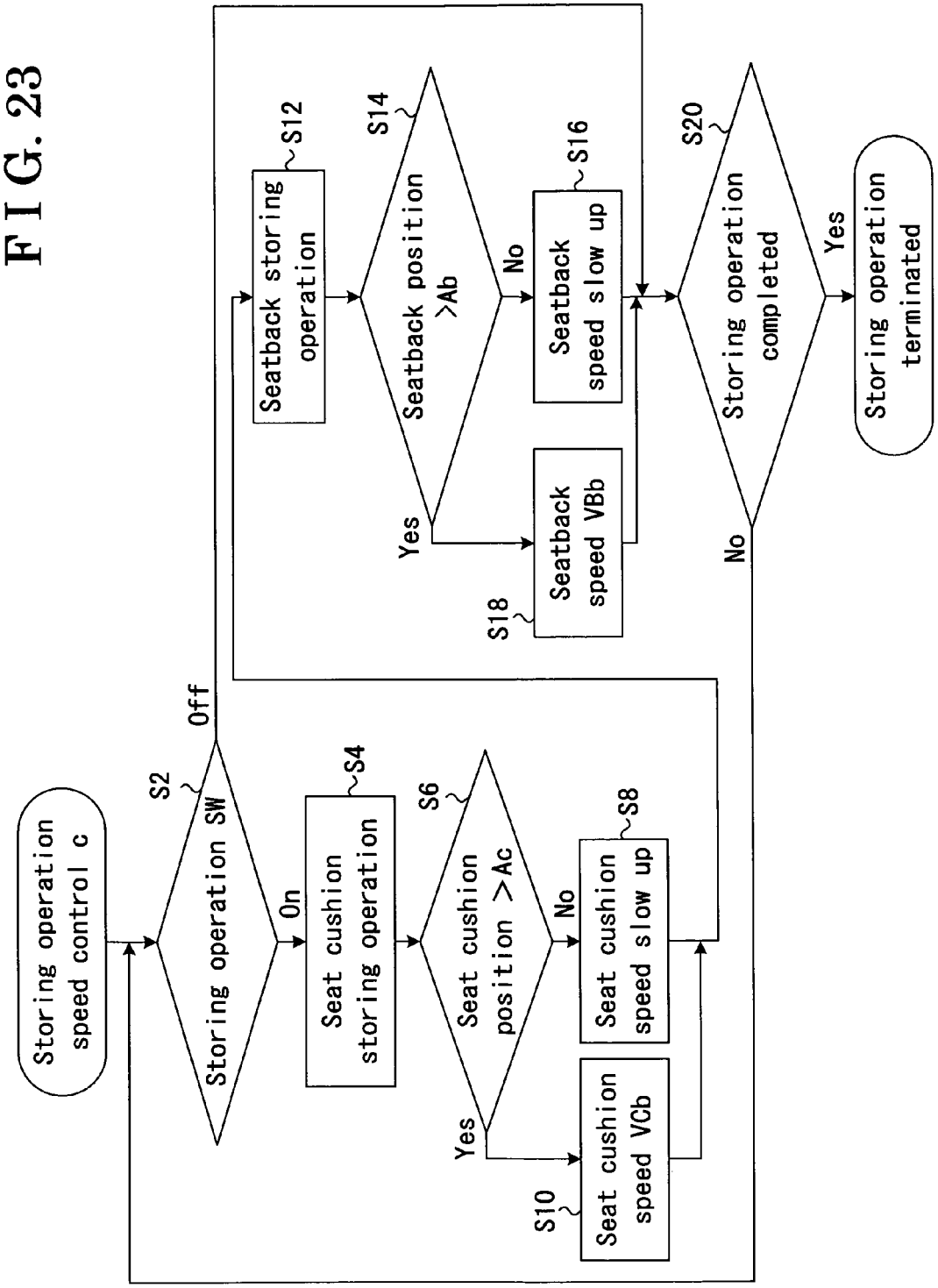
FIG. 23 is a flow chart illustrating a storing operation speed control c.

A storing operation speed control c will be explained hereinafter with reference to FIGS. 23-25. In step S6, the position of the seat cushion 2 is determined if the present position of the seat cushion 2 reaches the intermediate position Ac. If the present position of the seat cushion 2 is not reached to the intermediate position Ac (step S6: NO), the seat cushion 2 slows up by gradually increasing the operating speed. The intermediate position Ac is set so that the interference of the seat apparatus 1 with the other components of the vehicle is not generated even when the operating speed of the seat cushion 2 is increased. The intermediate position Ac is memorized in the memory of the ECU 600. In contrast, when the present position of the seat cushion 2 reaches the intermediate position Ac (step S10: YES), because the possibility of the interference of the seat apparatus 1 with the other components of the vehicle is avoided, the operating speed of the seat cushion 2 is set at VCb (VCb is relatively fast) for reducing the entire operating time.

Further, if the present position of the seatback 3 is not reached to the intermediate position Ab (step S14: NO), the seatback 3 slows up by gradually increasing the operating speed. The intermediate position Ab is set so that the interference of the seat apparatus 1 with the other components of the vehicle is not generated even when the operating speed of the seatback 3 is increased. The intermediate position Ab is memorized in the memory of the ECU 600. In contrast, if the present position of the seatback 3 reaches the intermediate position Ab (step S14: YES), because the possibility of the interference of the seat apparatus with the other components of the vehicle is avoided, the operating speed of the seatback 3 is set at VBb (VBb is relatively fast) for reducing the entire operation time.

Figure 24:
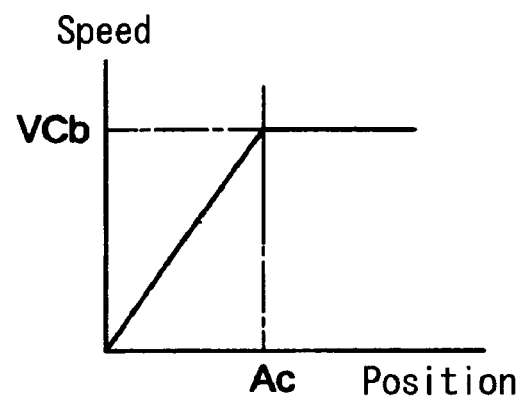
FIG. 24 is a graph indicating a relation between an operating speed VCb of the seat cushion and a position of the seat cushion in the storing operation speed control c.
Figure 25:
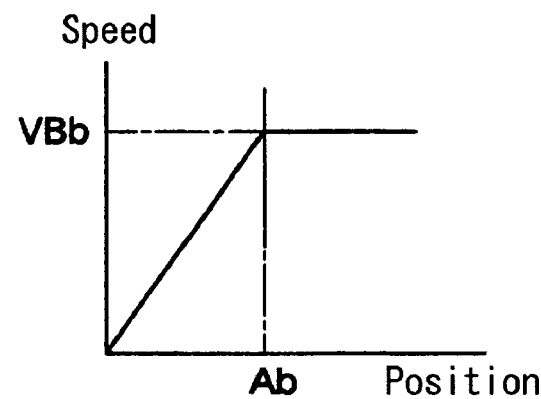
FIG. 25 is a graph indicating a relation between an operating speed VBb of the seatback and a position of the seatback in the storing operation speed control c.

As illustrated in FIG. 24, the operating speed of the seat cushion 2 gradually increases in the early operation period and the operating speed in the later operation period becomes relatively faster than the early operation period in the storing operation speed control c. Further, as illustrated in FIG. 25, the operating speed of the seatback 3 gradually increases in the early operation period and the operating speed in the later operation period becomes relatively faster than the early operation period in the storing operation speed control c. Accordingly, the entire operating time can be reduced without causing the interference of the seat apparatus 1 with the other components of the vehicle. In the storing operation speed control c according to the embodiment of the present invention, the operation of the seat cushion 2 and the operation of the seatback 3 are started at about the same time. However, the present invention is not limited thereto. Alternatively, or in addition, the operation starting time of the seatback 3 and the operation starting time of the seat cushion 2 may temporally be different in a condition where the operations of the seat cushion 2 and the operation of the seatback 3 are overlapped with each other.

(Returning Operation Speed Control a)

Figure 26:
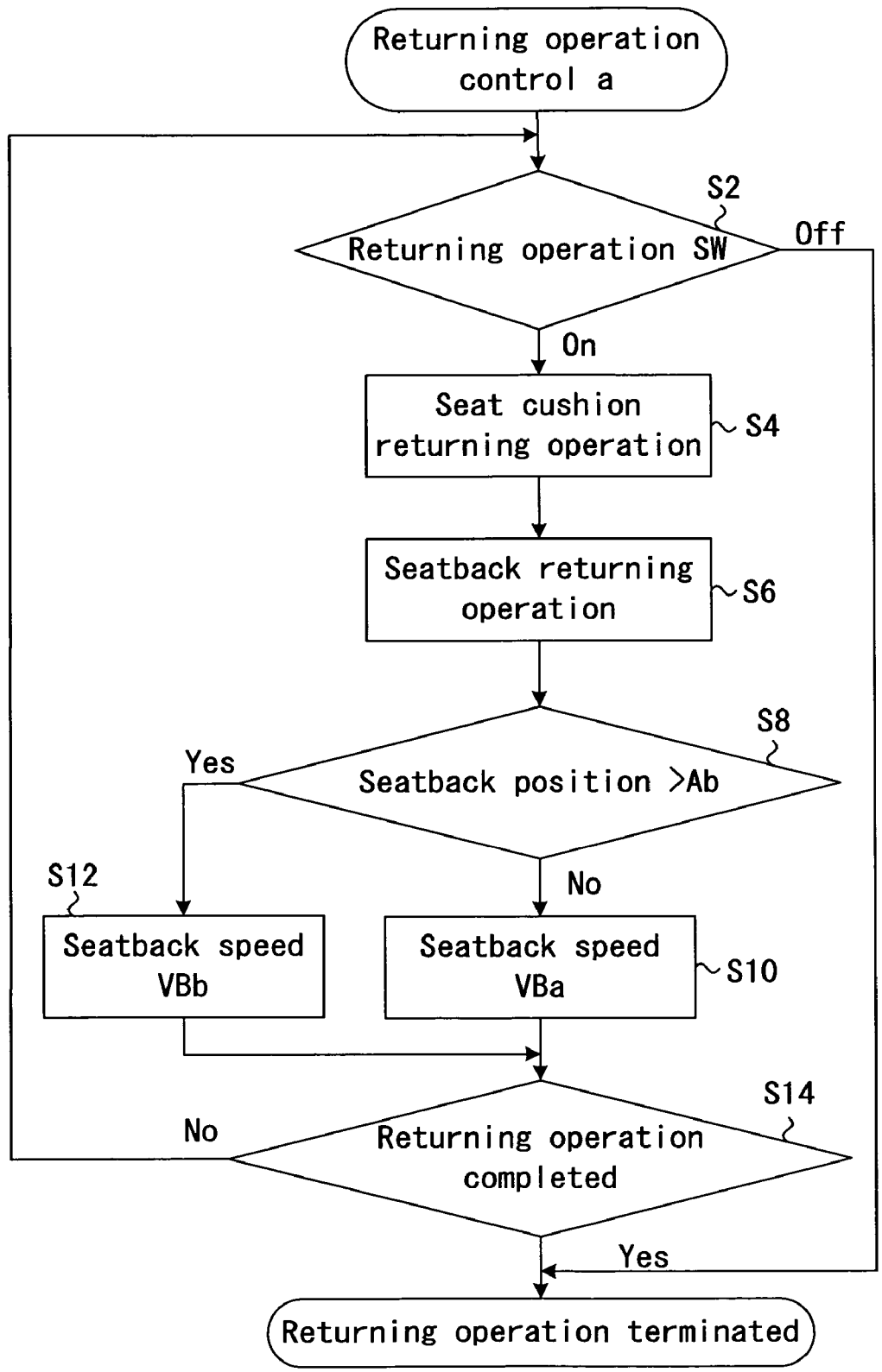
Figure 27:
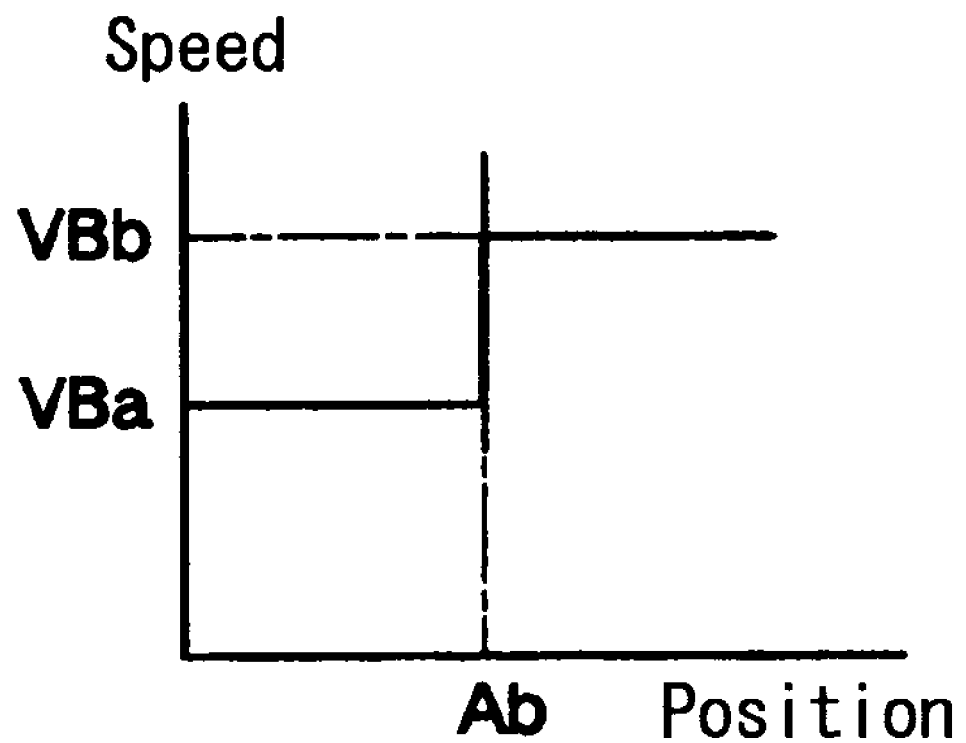

A returning operation speed control a will be explained hereinafter with reference to FIGS. 26 and 27. In the returning operation speed control a, the operation state of the operating switch 100 is read in step S2. If the operating switch 100 is turned on to operate the seat cushion 2 and the seatback 3 in the returning operation, the returning operation of the seat cushion 2 is started in step S4 and the returning operation of the seatback 3 is started in step S6. The returning operation of the seatback 3 and the returning operation of the seat cushion 2 are performed at about the same time. Then, the position of the seatback 3 is determined if the present position of the seatback 3 reaches the intermediate position Ab in step S8. The intermediate position Ab is set so that the interference of the seat apparatus 1 with the other components of the vehicle is not generated even when an operating speed of the seatback 3 is increased. The intermediate position Ab is memorized in the memory of the ECU 600. If the present position of the seatback 3 is not reached to the intermediate position Ab (step S8: NO), because of the possibility of the interference of the seat apparatus 1 with the other components of the vehicle, the operating speed of the seatback 3 is set at VBa. The operating speed VBa is relatively slower than an operating speed VBb and the interference of the seat apparatus 1 with the other components of the vehicle can thereby be avoided.

In contrast, if the present position of the seatback 3 reaches the intermediate position Ab (step S8: YES), because the possibility of the interference of the seat apparatus 1 with the other components of the vehicle is avoided, the operating speed of the seatback 3 is set at VBb (VBb is relatively faster than VBa). Accordingly, the entire operating time can be reduced. Then, the completion of the returning operation of the seat apparatus 1 is determined in step 14. If at least one of the returning operations is not completed (step S14: NO), the procedure returns to step S2 to continue the at least one of the operations, which is not completed. In contrast, if all the returning operations are completed (step S14: YES), the returning operation of the seat apparatus 1 is terminated. As illustrated in FIG. 27, the operating speed of the setback 3 is relatively low in the early operation period and is relatively high in the later operation period in the returning operation speed control a. Accordingly, the entire operating time can be reduced. The step S8 severs as the position determining means for determining if the moved position of the seatback 3 reaches the predetermined position on the basis of the physical quantity regarding the seatback 3 detected by means of the physical quantity detecting means. Further, the step S12 serves as the speed change command means which outputs the command for changing (increasing) the operating speed of the seatback 3 from the initial operating speed. In the returning operation speed control a according to the embodiment of the present invention, the operation of the seat cushion 2 and the operation of the seatback 3 are started at about the same time. However, the present invention is not limited thereto. Alternatively, or in addition, the operation starting time of the seatback 3 and the operation starting time of the seat cushion 2 may temporally be different in a condition where the operation of the seat cushion 2 and the operation of the seatback 3 are overlapped with each other.

(Returning Operation Speed Control b)

Figure 28:
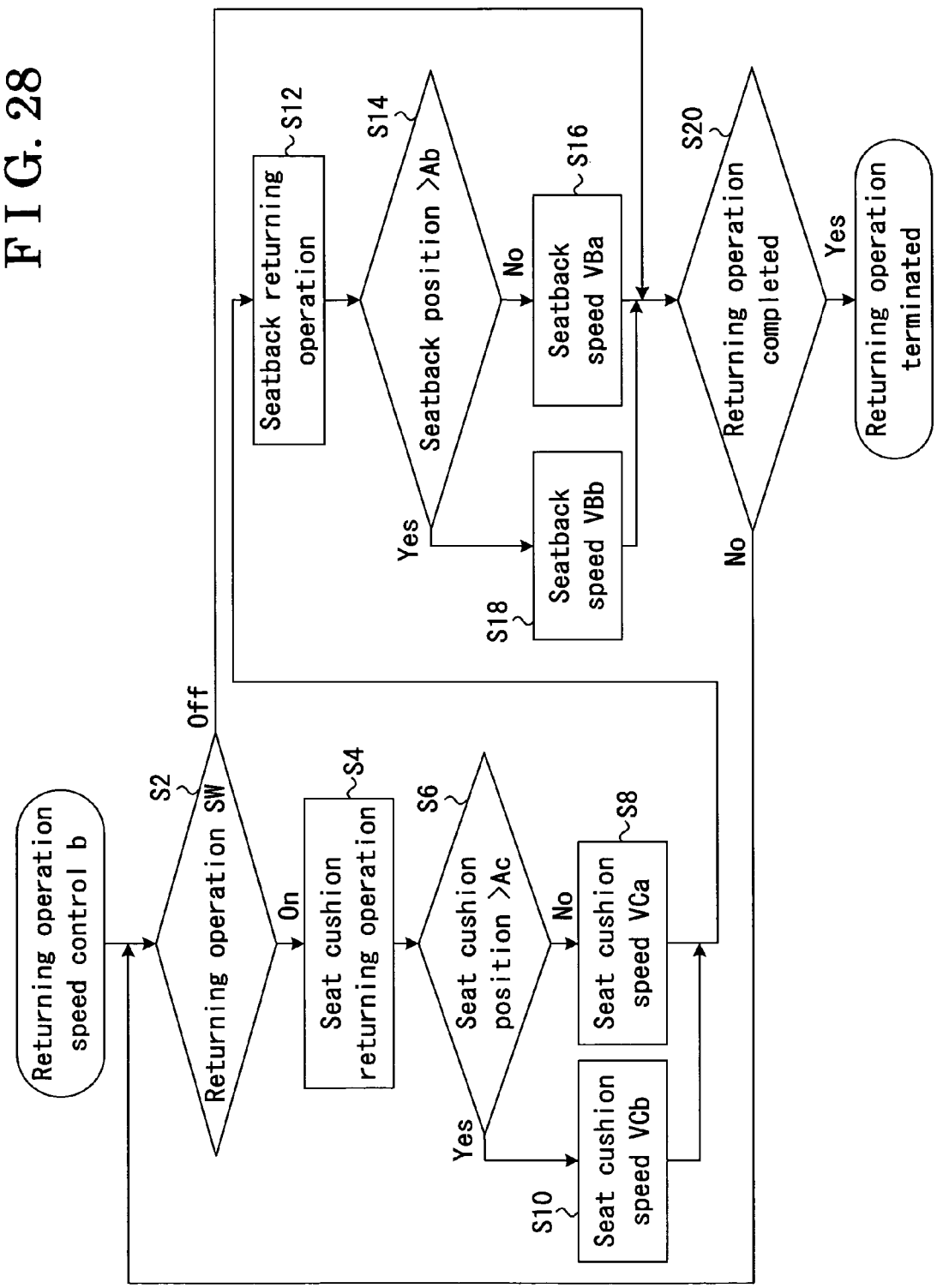
FIG. 28 is a flow chart illustrating a returning operation speed control b.
Figure 29:
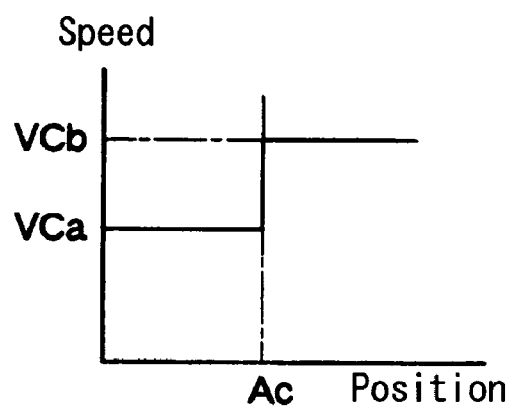
FIG. 29 is a graph indicating a relation between operating speed VCb and VCa of the seat cushion and a position of the seat cushion in the returning operation speed control b.
Figure 30:
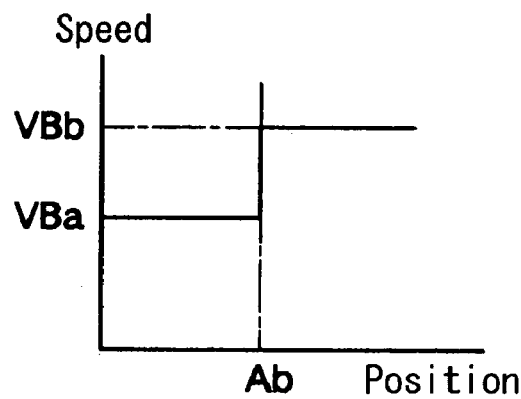
FIG. 30 is a graph indicating a relation between moving spee VBb and VBa of the seatback and a position of the seatback in the returning operation speed control b.

A returning operation speed control b will be explained hereinafter with reference to FIGS. 28-30. In the returning operation speed control b, the operation state of the operating switch 100 is read in step S2. If the operating switch 100 is turned on to operate the seat cushion 2 and the seatback 3 in the returning operation, the returning operation of the seat cushion 2 is started in step S4. Then, the position of the seat cushion 2 is determined if the present position of the seat cushion 2 reaches the intermediate position Ac in step 6. The intermediate position Ac is set so that the interference of the seat apparatus 1 with the other components of the vehicle is not generated even when the operating speed of the seat cushion 2 is increased. The intermediate position Ac is memorized in the memory of the ECU 600 with respect to each type of vehicle. If the present position of the seat cushion 2 is not reached to the intermediate position Ac (step S6: NO), the operating speed of the seat cushion 2 is set at VCa (VCa is relatively slower than VCb) for avoiding the interference of the seat apparatus 1 with the other components of the vehicle. In contrast, if the present position of the seat cushion 2 reaches the intermediate position Ac (step S6: YES), because the possibility of the interference of the seat apparatus 1 with the other components of the vehicle is avoided, the operating speed of the seat cushion 2 is set at VCb (VCb is relatively faster then VCa). Accordingly, the entire operating time can be reduced. Further, the returning operation of the seatback 3 is started in step 12. Then, the position of the seatback 3 is determined if the present position of the seatback 3 reaches the intermediate position Ab in step S 14. The intermediate position Ab is preliminarily set. If the present position of the seatback 3 is not reached to the intermediate position Ab (step S14: NO), the operating speed of the seatback 3 is set at VBa (VBa is relatively slower than VBb) for avoiding the interference of the seat apparatus 1 with the other components of the vehicle. In contrast, when the present position of the seatback 3 reaches the intermediate position Ab (step S14: YES), because the possibility of the interference of the seat apparatus 1 with the other components of the vehicle is avoided, the operating speed of the seatback 3 is set at VBb (VBb is relatively faster than VBa) for reducing the entire operating time. Then, the completion of the returning operation of the seat apparatus 1 is determined in step S20. If at least one of the returning operations is not completed (step S20: NO), the procedure returns to step S2 to continue the at least one of the returning operations, which is not completed. In contrast, if all the returning operations are completed (step S20: YES), the returning operation of the seat apparatus 1 is terminated. The step S6 severs as the position determining means for determining if the moved position of the seat cushion 2 reaches the predetermined position on the basis of the physical quantity regarding the seat cushion 2 detected by means of the physical quantity detecting means. Further, the step S10 serves as the speed change command means which outputs the command for changing (increasing) the operating speed of the seat cushion 2 from the initial operating speed.

The step S14 severs as the position determining means for determining if the moved position of the seatback 3 reaches the predetermined position on the basis of the physical quantity regarding the seatback 3 detected by means of the physical quantity detecting means. Further, the step S18 serves as the speed change command means which outputs the command for changing (increasing) the operating speed of the seatback 3 from the initial operating speed. In the returning operation speed control b according to the embodiment of the present invention, the operation of the seat cushion 2 and the operation of the seatback 3 are started at about the same time. However, the present invention is not limited thereto. Alternatively, or in addition, the operation starting time of the seat cushion 2 and the operation starting time of the seatback 3 may temporally be different in a condition where the operation of the seat cushion 2 and the operation of the seatback 3 are overlapped with each other.

(Returning Operation Speed Control c)

Figure 31:
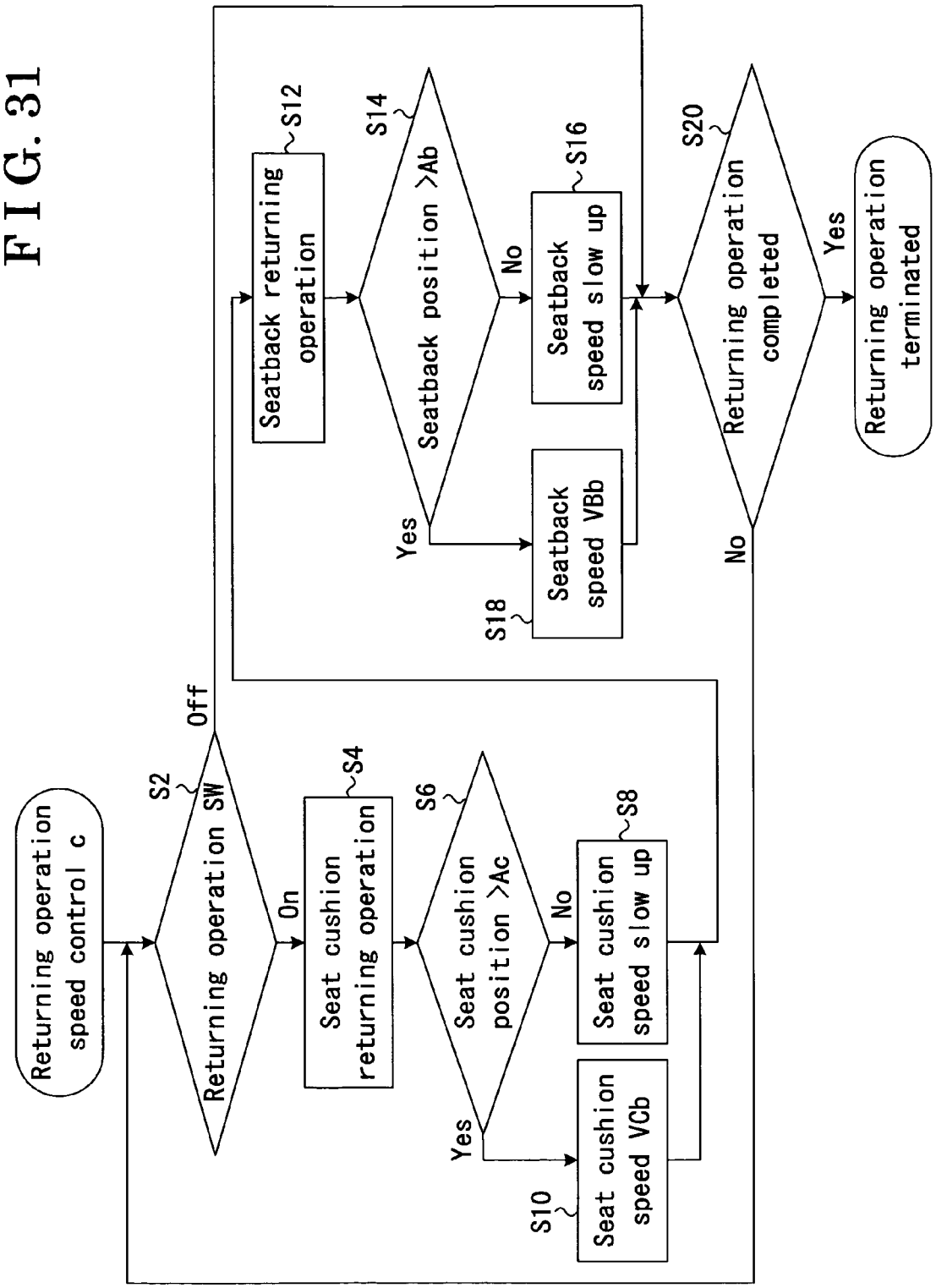
FIG. 31 is a flow chart illustrating a returning operation speed control c.
Figure 32:
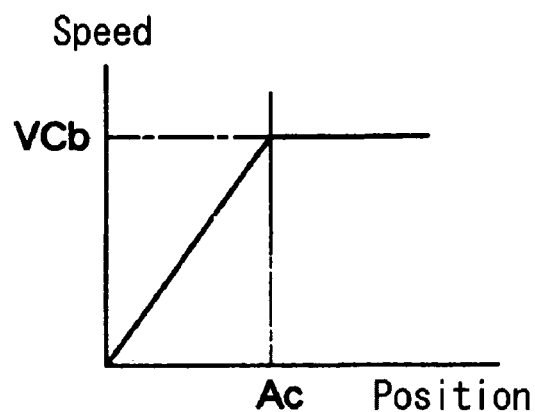
FIG. 32 is a graph indicating a relation between an operating speed VCb of the seat cushion and a position of the seat cushion in the returning operation speed control c.
Figure 33:
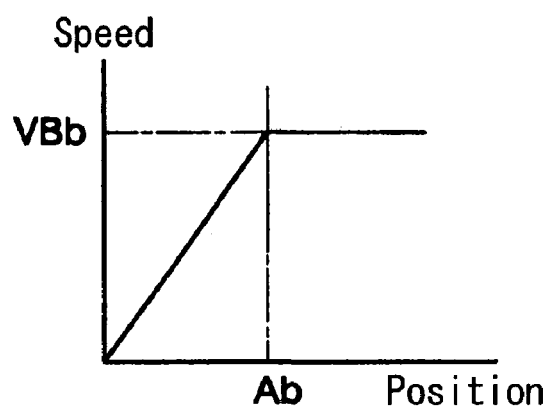
FIG. 33 is a graph indicating a relation between an operating speed VBb of the seatback and a position of the seatback in the returning operation speed control c.

A returning operation speed control c will be explained hereinafter with reference to FIGS. 31-33. A flow chart of the returning operation speed control c illustrated in FIG. 31 is basically similar to that of the returning operation speed control b illustrated in FIG. 28. However, in the returning operation speed control c, the position of the seat cushion 2 is determined if the present position of the seat cushion 2 reaches the intermediate position Ac in step S6. If the present position of the seat cushion 2 is not reached to the intermediate position Ac (step S6: NO), the seat cushion 2 slows up by gradually increasing the operating speed in step S8. In contrast, if the present position of the seat cushion 2 reaches the intermediate position Ac (step S6: YES), because the possibility of the interference of the seat apparatus 1 with the other components of the vehicle is avoided, the operating speed of the seat cushion 2 is set at VCb (VCb is relatively fast) for reducing the entire operating time. Further, if the present position of the seatback 3 is not reached to the intermediate position Ab (step S14: NO), the seatback 3 slows up by gradually increasing the operating speed of the seatback 3 in step S16. In contrast, if the present position of the seatback 3 reaches the intermediate position Ab (step S14: YES), because the possibility of the interference of the seat apparatus 1 with the other components of the vehicle is avoided, the operating speed of the seatback 3 is set at VBb (VBb is relatively fast) in step S18 for reducing the entire operating time. As illustrated in FIGS. 32 and 33, the operating speed of the seat cushion 2 and the seatback 3 is relatively low in the early operation period and is relatively high in the later operation period. Accordingly, the entire operating time can be reduced without causing the interference of the seat apparatus 1 with the other components of the vehicle. In the returning operation speed control c according to the embodiment of the present invention, the operation of the seat cushion 2 and the operation of the seatback 3 are started at about the same time. However, the present invention is not limited thereto. Alternatively, or in addition, the operation starting time of the seat cushion 2 and the operation starting time of the seatback 3 may temporally be different in a condition where the operation of the seat cushion 2 and the operation of the seatback 3 are overlapped with each other.

The aforementioned embodiment of the present invention is applied to the seat apparatus placed at the rear side of the vehicle. However, the present invention is not limited thereto. Alternatively, or in addition, the present invention may be applied to a seat apparatus placed at the front side of the vehicle. Further, the embodiment of the present invention is applied to the seat apparatus of the vehicle. However, the present invention is not limited thereto. Alternatively or in addition, the present invention may be applied to any seat apparatus of variety of use. According to the embodiment of the present invention, the seating position P1 is placed at the relatively front side of the floor 4 and the storage position P2 is placed at the relatively rear side of the floor 4. Alternatively, or in addition, an arrangement of the seating position P1 and the storage position P2 can be reversed. Further, the system of changing the position of the seat apparatus 1 between the seating position P1 and the storage position P2 is not limited to the structures illustrated in FIGS. 1-5. Alternatively, or in addition, the system of vertically flipping the seatback 3 may be applicable. According to the embodiment of the present invention, the link devices for moving the seat cushion 2 is provided. However, the present invention is not limited thereto. Alternatively or in addition, other mechanisms such as a gear mechanism may be applicable. Further, according to the embodiment of the present invention, when the manual operation of the operating switch 100 is interrupted, the driving of the seatback motor 400 and the seat cushion motor 402 are stopped and the seat apparatus 1 is stopped at the present position. Alternatively, or in addition, the seatback motor 400 and the seat cushion motor 402 may continuously be driven by means of a fingertip control.

The present invention can be applied to a seat apparatus capable of changing its position between the seating position and the storage position, which is used for the vehicle, aircraft, ship, household purpose, institutional purpose, or the like.

According to the embodiment of the present invention, when the seat cushion and the seatback are operated from the seating position to the storage position and/or from the storage position to the seating position, the operation starting time of the seat cushion and the operation starting time of the seatback are temporally different in a condition where the movement of the seat cushion and the movement of the seatback are overlapped with each other. Accordingly, the interference of at least one of the seat cushion and the seatback with the other components of the vehicle is restricted. Further, operating speed of at least one of the seat cushion and the seatback is changed from the initial speed in the course of the movement of the seat cushion and the movement of the seatback from the seating position to the storage position and/or from the storage position to the seating position. Accordingly, the interference of at least one of the seat cushion and the seatback with the other components of the vehicle can further be restricted. If there is the interference of the seat cushion and the seatback with the other components of the vehicle, the operating speed of at least one of the seat cushion and the seatback may appropriately be increased or reduced. For example, if there is no possibility of the interference, the operating speed may be increased. Further, if there is the possibility of the interference, the operating speed may be reduced.

According to the embodiment of the present invention, the operating speed of at least one of the seat cushion and the seatback is changed (increased or reduced) from the initial speed in the course of the movement of the seat cushion and the movement of the seatback from the seating position to the storage position and/or from the storage position to the seating position. If there is no interference of at least one of the seat cushion and the seatback with the other components of the vehicle, the entire operating time can be reduced by increasing the operating speed. If there is possibility of the interference, the operating speed may be reduced. The operation of the seatback and the operation of the seat cushion may temporally be overlapped. Alternatively, the operation of the seatback and the operation of the seat cushion may not temporally be overlapped.

Further, according to the embodiment of the present invention, the physical quantity detecting means (e.g. sensor) is provided for directly or indirectly detecting the physical quantity regarding at least one of the moved position, the moving amount, and the operating speed of at least one of the seat cushion and the seatback. The physical quantity includes current, voltage, duty ratio, and pulses per unit time of the drive device for driving the seat cushion or the seatback. A control unit includes the position determining means for determining if the moved position reaches the predetermined position on the basis of the physical quantity detected by means of the physical quantity detecting means. The control unit further includes the speed change command means for changing (increasing or reducing) the operating speed from the initial operating speed when the position determining means determines that the moved position reaches the predetermined position. The position determining means and the speed change command means can be formed as software using the CPU. Further, the operation starting time of the seat cushion and the operation starting time of the seatback may temporally be different in a condition where the operations of the seat cushion and the seatback are overlapped with each other.

According to the embodiment of the present invention, when the storing operation of the seat cushion and the storing operation of the seatback are performed from the seating position to the storage position, the control unit starts (i) the storing operation of the seatback, and starts (ii) the storing operation of the seat cushion within the period after the predetermined time has passed from the start of the storing operation of the seatback and before the storing operation of the seatback is completed. On this occasion, the operation starting time of the seat cushion and the operation starting time of the seatback are temporally different in a condition where the operations of the seat cushion and the seatback are overlapped with each other. When the movement of the seat cushion and the movement of the seatback are temporally overlapped with each other, the entire operating time can be reduced. Further, when the operation starting time of the seat cushion and the operation starting time of the seatback are temporally different, the interferences of the seat cushion and the seatback with the other components of the vehicle can easily be avoided.

According to the embodiment of the present invention, when the storing operation of the seat cushion and the storing operation of the seatback are performed from the seating position to the storage position, the control unit starts (i) the storing operation of the seatback, and starts (ii) the storing operation of the seat cushion within the period after the seatback has reached the predetermined intermediate position and before the storing operation of the seatback is completed. On this occasion, the operation starting time of the seat cushion and the operation starting time of the seatback are temporally different in a condition where the operations of the seat cushion and the seatback are overlapped with each other. Thereby, the interferences of the seat cushion and the seatback with the other components of the vehicle can easily be avoided.

According to the embodiment of the present invention, the seat drive devices includes the first drive device for moving the seat cushion and the second drive device for driving the seatback. Because the first drive device for the seat cushion and the second drive device for the seatback can independently be driven, the seat cushion and the seatback can independently be operated. Accordingly, the seat cushion and the seatback can continuously be operated without difficulty.

The usage of the seat apparatus is not limited. In a condition where the seat apparatus is applied to the vehicle, the seat apparatus can be a front seat or a backseat.

According to the embodiment of the present invention, when the seat cushion and the seatback are moved between the seating position and the storage position, the seat cushion and the seatback are moved without vertically flipping in such a manner that the seat cushion is remained at the lower side and the seatback is remained at the upper side. Because the seat apparatus is not vertically flipped, the excessive falling of the objects may be avoided even when the objects are placed on the seat apparatus. However, the present invention is not limited thereto. Alternatively, or in addition, the system may be adopted for moving the seat cushion and the seatback between the seating position and the storage position by vertically flapping the seat cushion and the seatback.

According to the embodiment of the present invention, the seat apparatus includes the headrest provided at the seatback for supporting the head of the operator. The seat apparatus further includes the third drive device for adjusting the position of the headrest. The control unit outputs the command to the third drive device for adjusting the headrest in a direction in which the interference of the headrest and the other components of the vehicle is restricted when the seat cushion and the seatback are driven from the seating position to the storage position. Further, the control unit outputs the command to the third drive device for moving the headrest in a direction of the headrest using position when the seat cushion and the seatback are driven from the storage position to the seating position. Further, according to the embodiment of the present invention, the seat apparatus includes the fourth drive device for adjusting the position of the seat cushion in the slide direction. The control unit outputs the command to the fourth drive device for adjusting the position of the seat cushion by sliding the seat cushion in a direction in which the interference of at least one of the seat cushion and the seatback is restricted when the seat cushion and the seatback is moved from the seating position to the storage position and/or from the storage position to the seating position. According to the embodiment of the present invention, the operation of at least one of the seat cushion and the seatback and the operation of the headrest can temporally be overlapped for reducing the entire operating time. More specifically, the operation starting time of at least one of the seat cushion and the seatback and the operation starting time of the headrest are temporally different while temporally overlapping the movement of the at least one of the seat cushion and the seatback with the movement of the headrest.

Further, the operation of at least one of the seat cushion and the seatback and the slide operation of the frame of the seat cushion can temporally be overlapped. The operation starting time of at least one of the seat cushion and the seatback and a slide operation starting time of the frame of the seat cushion can be shifted in a condition where the operation of the at least one of the seat cushion and the seatback and the slide operation of the frame of the seat cushion are temporally overlapped. Further, the seat apparatus includes the signal generating portion which outputs a changing signal for performing a changing operation of the seat cushion and the seatback between the seating position and the storage position. The signal generating position includes the operating switch which is manually operated by the operator, a sensor for detecting opening and closing states of a door, or the like. The seat apparatus further includes the lock device for locking and unlocking the seat cushion at the seating position. The present invention is applicable as long as the lock device is placed at least one of the seat cushion and the base body such as the floor at which the seat cushion is provided.

According to the embodiment of the present invention, the seat apparatus includes the seat cushion, on which the operator is seated, the seatback for supporting the back of the operator, the seat drive device for changing the position of the seat cushion and the seatback between the seating position and the storage position by moving the seat cushion and the seatback, and the control unit for controlling the seat drive device. When the seat cushion and the seatback are moved from the seating position to the storage position and/or from the storage position to the seating position, the control unit shifts the operation starting time of the seat cushion and the operation starting time of the seatback while the movement of the seat cushion and the movement of the seatback are temporally overlapped with each other for restricting the interference of at least one of the seat cushion and the seatback with the other components of the vehicle.

According to the embodiment of the present invention, in the seating position, the seat apparatus is set so that the operator can be seated on the seat apparatus. In the storage position, the seat apparatus is stored. On this occasion, the seat apparatus may be stored in the recess portion or in a nonuse position (not limited to the recess portion). The interference of the seat apparatus includes conditions in which the seat apparatus is in contact with the other components of the vehicle, and the seat apparatus is excessively close to the other components of the vehicle.

According to the embodiment of the present invention, when the positions of the seat cushion and the seatback are changed between the seating position and the storage position, because the movement of the seat cushion and the movement of the seatback are temporally overlapped with each other, the entire operating time required for the changing operation can be reduced. When the movement of the seat cushion and the movement of the seatback are started at the same time, the possibility of the interference of the seat cushion or the seatback with the other components (e.g., the wall, the door) may occur. However, according to the embodiment of the present invention, the operation starting time of the seat cushion and the operation starting time of the seatback are temporally shifted in the direction in which the interference of at least one of the seat cushion and the seatback is restricted. Accordingly, the interference of at least one of the seat cushion ant the seatback can be restricted. For example, the stand angle of the seatback relative to the seat cushion is large at the seating position. Therefore, when the movement of the seat cushion and the movement of the seatback are started at the same time, the possibility of the interference of the seatback, the stand angle of which is large at the movement initial stage, with the other components of the vehicle may occur. On this occasion, when the interference of the seatback is tried to be prevented, the moving amount of the seat cushion is restricted and the storing operations of the seat cushion and the seatback from the seating position to the storage position are restricted. Further, for example, the stand angle of the seatback relative to the seat cushion is small at the storage position. Therefore, when the movement of the seat cushion and the movement of the seatback are started at the same time, because the stand angle of the seatback is large at the movement initial stages in a condition where the seat apparatus is moved from the storage position to the seating position, the possibility of the interference of the seatback with the other components of the vehicle may occur. On this occasion, when the interference of the seatback is tried to be prevented, the moving amount of the seat cushion is restricted and the storing operations of the seat cushion and the seatback from the seating position to the storage position are restricted. According to the embodiment of the present invention, the operation starting time of the seat cushion and the operation starting time of the seatback are temporally different for restricting the interference of at least one of the seat cushion and the seatback. Therefore, the interferences of the seatback and the seat cushion can be restricted.

According to the embodiment of the present invention, the seat apparatus includes the seat cushion on which the operator is seated, the seatback for supporting the back of the operator, the seat drive device for changing the position of the seat cushion and the seatback between the seating position and the storage position, and the control unit for controlling the seat drive device. The control unit changes the operating speed of at least one of the seat cushion and the seatback from the initial operating speed in the course of the movement of the seat cushion and the movement of the seatback from the seating position to the storage position and/or from the storage position to the seating position for restricting the interference of at least one of the seat cushion and the seatback with the other components of the vehicle.

According to the embodiment of the present invention, the operating speed of at least one of the seat cushion and the seatback is changed (increased or reduced) from the initial operating speed in the course of the movement of the seat cushion and the seatback from the seating position to the storage position and/or from the storage position to the seating position for restricting the interference of at least one of the seat cushion and the seatback. Accordingly, the interferences of the seat cushion and the seatback with the other components of the vehicle can be restricted.

According to the embodiment of the present invention, the seat apparatus includes the seat cushion on which the operator is seated, the seatback for supporting the back of the operator, the seat drive device for changing the position of the seat cushion and the seatback between the seating position and the storage position by moving the seat cushion and the seatback, and the control unit for controlling the seat drive device. The seat drive device includes the first drive device for moving the seat cushion and the second drive device for moving the seatback. The second drive device can independently be driven from the first drive device. When the storing operation of the seat cushion and the storing operation of the seatback are performed from the seating position to the storage position, (i) the storing operation of the seatback is started by means of the second drive device, and (ii) the storing operation of the seat cushion is started by means of the first drive device immediately after the completion of the storing operation of the seatback.

The first drive device for the seat cushion and the second drive device for the seatback can independently driven from each other. Therefore, the storing operation of the seat cushion can be started immediately after the completion of the storing operation of the seatback and the entire operating time can advantageously be reduced. According to the embodiment of the present invention, the first drive device for the seat cushion and the second drive device for the seatback can independently driven from each other. Therefore, because the single drive device is not required to continuously be driven, the load applied to the first drive device and the second drive device can be reduced. Further, the first drive device and the second drive device can individually be driven, and the first drive device and the second drive device can be downsized. Moreover, the second drive device can promptly be driven immediately after the first drive device is driven and the first drive device can promptly be driven immediately after the first drive device is driven without difficulty. Accordingly, when the storing operations of the seat cushion and the seatback are performed from the seating position to the storage position, (i) the storing operation of the seatback is started by means of the second drive device, and (ii) the storing operation of the seat cushion is started by means of the first drive device immediately after the completion of the storing operation of the seatback without difficulty. Therefore, according to the embodiment of the present invention, the storing operation of the seatback is completed when the storing operation of the seat cushion is started. Thus, the stand angle of the seatback at this point is small and the possibility of the interference can be reduced. Accordingly, because the space is increased, the interferences of the seatback and the seat cushion with the other components of the vehicle can be restricted.

According to the embodiment of the present invention, when the returning operations of the seat cushion and the seatback are performed from the storage position to the seating position, (1) the returning operation of the seat cushion is started by means of the first drive device, and (ii) the returning operation of the seatback is started by means of the second drive device immediately after the completion of the returning operation of the seat cushion. Because the first drive device for the seat cushion and the second drive device for the seatback can independently be driven from each other, the returning operation of the seatback can be started immediately after the completion of the returning operation of the seat cushion.

With the configuration of the seat apparatus according to the present invention, the interferences of the seatback and the seat cushion with the other components of the vehicle can be restricted while reducing the entire operating time required for the changing operation when the positions of the seat cushion and the seatback are changed from the seating position to the storage position and/or from the storage position to the seating position.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus comprising:
    a seat cushion on which an operator is to be seated;
    a seatback for supporting the operator seated on the seat cushion;
    a seat drive device changing a position of the seat cushion and the seatback between a seating position and a storage position by operating the seat cushion and the seatback;
    a control unit for controlling the seat drive device;
    the control unit controlling the seat drive device to change an operating speed of at least one of the seat cushion and the seatback in motion from an initial operating speed to a different non-zero operating speed while the seat cushion and the seatback are moving between the seating position to the storage position for restricting an interference of the at least one of the seat cushion and the seatback with other components in a vehicle compartment;
    a physical quantity detecting device directly or indirectly detecting physical quantity regarding at least one of a moved position, a moving amount, and an operating speed of at least one of the seat cushion and the seatback, wherein
    the control unit comprises:
        a position determining device determining if the moved position of the at least one of the seat cushion and the seatback reaches a predetermined position on a basis of the physical quantity detected by means of the physical quantity detecting device; and
        a speed change command device outputting a command to the seat drive device for changing the operating speed from the initial operating speed to the different non-zero operating speed when the position determining device determines that the moved position has reached the predetermined position.

2. The seat apparatus according to claim 1, further comprising:
    a headrest provided at the seatback for supporting a head of the operator; and
    a headrest drive device for adjusting a position of the headrest relative to the seatback.

3. The seat apparatus according to claim 2, wherein when the seat cushion and the seatback are operated from the seating position to the storage position, the control unit outputs a command to the headrest drive device for adjusting the position of the headrest in a direction in which an interference of the headrest is restricted.

4. The seat apparatus according to claim 2, wherein when the seat cushion and the seatback are operated from the storage position to the seating position, the control unit outputs a command to the headrest drive device for driving the headrest in a direction of a headrest using position.

5. The seat apparatus according to claim 1, further comprising:
    a seat slide drive device for adjusting a position of the seat cushion in a slide direction.

6. The seat apparatus according to claim 5, wherein when the seat cushion and the seatback are moved between the seating position and the storage position, the control unit outputs a command to the seat slide drive device for adjusting the position of the seat cushion by sliding the seat cushion in a direction in which the interference of the at least one of the seat cushion and the seatback is restricted.

7. The seat apparatus according to claim 1, further comprising:
    a signal generating portion which outputs a signal for changing the position of the seat cushion and the seatback between the seating position and the storage position.

8. The seat apparatus according to claim 1, further comprising:
    a lock device provided at at least one of the seat cushion and a base body on which the seat cushion is provided, the lock device locking and unlocking the seat cushion at the seating position.

9. The seat apparatus according to claim 1, wherein before the seat cushion reaches a predetermined position at which the seatback does not interfere with other components in the vehicle compartment despite an increase of operating speed of the seat cushion, the seat cushion operates at a first predetermined speed, and the seat cushion moves at a second predetermined speed which is faster than the first predetermined speed when the position of the seat cushion is beyond the predetermined position.

10. The seat apparatus according to claim 1, wherein before the seatback reaches a predetermined position at which the seatback does not interfere with other components in the vehicle compartment despite an increase of operating speed of the seat cushion, the seat cushion operates at a first predetermined speed, and the seat cushion moves at a second predetermined speed which is faster than the first predetermined speed when the position of the seat cushion is beyond the predetermined position.

11. The seat apparatus according to claim 1, wherein before the seat cushion reaches a predetermined position at which the seatback does not interfere with other components in the vehicle compartment despite an increase of a moving speed of the seat cushion, the moving speed of the seat cushion is gradually increased, and the seat cushion moves at a speed at the predetermined position after the seat cushion is beyond the predetermined position.

12. The seat apparatus according to claim 1, wherein before the seatback reaches a predetermined position at which the seatback does not interfere with other components in the vehicle compartment despite an increase of a moving speed of the seatback, the moving speed of the seatback is gradually increased, and the seatback moves at a speed at the predetermined position after the seatback reaches the predetermined position.

13. The seat apparatus according to claim 1, wherein an operating time of the seat cushion temporally overlaps an operating time of the seatback.

14. The seat apparatus according to claim 1, wherein the storing operation of the seatback folds the seatback forward toward the seat cushion, the storing operation of the seat cushion moves the seat cushion backward towards the storage position; a transitional seating operation of the seatback moves the seatback away from the seat cushion towards an upright position; and a transitional seating operation of the seat cushion moves the seat cushion forward away from the storage position towards a seating position.

15. A seat apparatus comprising:
a seat cushion on which an operator is to be seated;
a seatback for supporting the operator seated on the seat cushion;
a seat drive device changing a position of the seat cushion and the seatback between a seating position and a storage position by operating the seat cushion and the seatback; a control unit for controlling the seat drive device, wherein
when the control unit outputs a command to move the seat cushion and the seatback from the seating position to the storage position, a storing operation of the seat cushion is started after starting a storing operation of the seatback, after an elapse of a first predetermined time after the start of the storing operation of the seatback, and before completing the storing operation of the seatback,
the first predetermined time is determined to be a time during which a stand angle of the seatback relative to the seat cushion is smaller than a stand angle of the seatback relative to the seat cushion at a start of the storing operation of the seat cushion when the seat cushion is moved towards the storing position so that the seatback does not interfere with other components in a vehicle compartment,
the control unit determines that the first predetermined time has passed;
a link mechanism connected to the seat cushion at a first connection point and configured to be connected to a vehicle floor at a second connection point, the link mechanism guiding movement of the seat cushion between the seating position and the storage position by rotating about the second connection point;
the seat cushion and/or the seatback moving between the seating position and the storage position under driving operation of the seat drive device in a state in which the seatback is positioned above the seat cushion;
the link mechanism being configured to raise the first connection point to a higher position relative to the position of the first connection point when the seat cushion is in the seating position as the seat cushion moves between the seating position and the storing position and to then guide the movement of the seat cushion downward to either the seating position or the storage position as the seat cushion continues movement between the seating position and the storage; and
wherein the link mechanism comprises a first link and a second link, the first link having one end connected to the seat cushion at the first connection point and a second end pivotally connectable to a recessed seat storage portion in the vehicle floor at the second connection point, the second link having one end pivotally connected to the seat cushion at a third connection point behind the first connection point and a second end pivotally connectable to the recessed seat storage portion in the vehicle floor, the seat cushion and the seatback being positionable in the recessed seat storage portion in the storage position.

16. The seat apparatus according to claim 15, wherein an operating speed of at least one of the seat cushion and the seatback in motion is changed from an initial operating speed of the at least one of the seat cushion and the seatback while the seat cushion and the seatback in motion are moving from the seating position to the storage position and/or the storage position to the seating position for restricting the interference of the at least one of the seat cushion and the seatback with other components in a vehicle compartment.

17. The seat apparatus according to claim 15, wherein
when a returning operation of the seat cushion and a returning operation of the seatback are performed from the storage position to the seating position, the control unit starts the returning operation of the seat cushion and starts the returning operation of the seatback after a second predetermined time has passed from a start of the returning operation of the seat cushion and before the returning operation of the seat cushion is completed,
the second predetermined time is determined to be a time during which the stand angle of the seatback relative to the seat cushion is such that the seatback does not interfere with the other components in the vehicle compartment when the seat cushion is moved towards the seating position, and
the control unit determines that the second predetermined time has passed.

18. The seat apparatus according to claim 15, wherein the seat drive device comprises:
a first drive device for driving the seat cushion; and
a second drive device for driving the seatback, the second drive device being independently driven from the first drive device.

19. The seat apparatus according to claim 15, wherein the storing operation of the seatback folds the seatback forward toward the seat cushion, the storing operation of the seat cushion moves the seat cushion backward towards the storage position; a transitional seating operation of the seatback moves the seatback away from the seat cushion towards an upright position; and a transitional seating operation of the seat cushion moves the seat cushion forward away from the storage position towards the seating position.

20. A seat apparatus comprising:
a seat cushion on which an operator is to be seated;
a seatback for supporting the operator seated on the seat cushion;
a seat drive device changing a position of the seat cushion and the seatback between a seating position and a storage position by operating the seat cushion and the seatback;
a control unit for controlling the seat drive device, wherein
when the control unit outputs a command to move the seat cushion and the seatback from the storage position to the seating position, a returning operation of the seatback is started after starting a returning operation of the seat cushion, after the seat cushion reaches a first intermediate position, and before the returning operation of the seat cushion is completed,
the first intermediate position is determined to be a position at which movement of the seatback relative to the seat cushion will not result in the seatback interfering with other components in a vehicle compartment,
the control unit determines that the seat cushion has reached the first intermediate position;

a link mechanism connected to the seat cushion at a first connection point and configured to be connected to a vehicle floor at a second connection point, the link mechanism guiding movement of the seat cushion between the seating position and the storage position by rotating about the second connection point;

the seat cushion and/or the seatback moving between the seating position and the storage position under driving operation of the seat drive device in a state in which the seatback is positioned above the seat cushion;

the link mechanism being configured to raise the first connection point to a higher position relative to the position of the first connection point when the seat cushion is in the seating position as the seat cushion moves between the seating position and the storing position and to then guide the movement of the seat cushion downward to either the seating position or the storage position as the seat cushion continues movement between the seating position and the storage position; and wherein the link mechanism comprises a first link and a second link, the first link having one end connected to the seat cushion at the first connection point and a second end pivotally connectable to a recessed seat storage portion in the vehicle floor at the second connection point, the second link having one end pivotally connected to the seat cushion at a third connection point behind the first connection point and a second end pivotally connectable to the recessed seat storage portion in the vehicle floor, the seat cushion and the seatback being positionable in the recessed seat storage portion in the storage position.

21. The seat apparatus according to claim 20, wherein
when a returning operation of the seat cushion and a returning operation of the seatback are performed from the storage position to the seating position, the control unit starts the returning operation of the seat cushion and starts the returning operation of the seatback after the seat cushion has reached a second intermediate position and before the returning operation of the seat cushion is completed, the second intermediate position is determined to be a position at which the stand angle of the seatback relative to the seat cushion is such that the seatback does not interfere with the other components in the vehicle compartment when the seat cushion is moved towards the seating position, and the control unit determines that the seat cushion has reached the second intermediate position.

22. The seat apparatus according to claim 20, wherein the storing operation of the seatback folds the seatback forward toward the seat cushion, the storing operation of the seat cushion moves the seat cushion backward towards the storage position; a transitional seating operation of the seatback moves the seatback away from the seat cushion towards an upright position; and a transitional seating operation of the seat cushion moves the seat cushion forward away from the storage position towards the seating position.

23. The seat apparatus according to claim 20, further comprising
position determining means for determining the position of the seat cushion during returning operation of the seat cushion from the storage position to the seating position, the control unit controlling the seat drive device to start the returning operation of the seat cushion after the position determining means determines the seat cushion has reached the first intermediate position.

24. A seat apparatus comprising:
a seat cushion on which an operator is to be seated;
a seatback for supporting the operator seated on the seat cushion;
a seat drive device changing a position of the seat cushion and the seatback between a seating position and a storage position by operating the seat cushion and the seatback;
a control unit for controlling the seat drive device, wherein
when the control unit outputs a command to move the seat cushion and the seatback from the seating position to the storage position, a storing operation of the seat cushion is started after starting a storing operation of the seatback, after the seatback reaches a first intermediate position, and before the storing operation of the seatback is completed;

the first intermediate position is determined to be a position at which a stand angle of the seatback relative to the seat cushion is smaller than a stand angle of the seatback relative to the seat cushion at a start of the storing operation of the seat cushion when the seat cushion is moved towards the storing position so that the seatback does not interfere with other components in a vehicle compartment;

the control unit determines that the seatback has reached the first intermediate position;

a link mechanism connected to the seat cushion at a first connection point and configured to be connected to a vehicle floor at a second connection point, the link mechanism guiding movement of the seat cushion between the seating position and the storage position by rotating about the second connection point;

the seat cushion and/or the seatback moving between the seating position and the storage position under driving operation of the seat drive device in a state in which the seatback is positioned above the seat cushion;

the link mechanism being configured to raise the first connection point to a higher position relative to the position of the first connection point when the seat cushion is in the seating position as the seat cushion moves between the seating position and the storing position and to then guide the movement of the seat cushion downward to either the seating position or the storage position as the seat cushion continues movement between the seating position and the storage; and wherein the link mechanism comprises a first link and a second link, the first link having one end connected to the seat cushion at the first connection point and a second end pivotally connectable to a recessed seat storage portion in the vehicle floor at the second connection point, the second link having one end pivotally connected to the seat cushion at a third connection point behind the first connection point and a second end pivotally connectable to the recessed seat storage portion in the vehicle floor, the seat cushion and the seatback being positionable in the recessed seat storage portion in the storage position.

* * * * *